US012691960B2

(12) United States Patent　　　　(10) Patent No.:　US 12,691,960 B2

Fleury et al.　　　　　　　　　　　　(45) Date of Patent:　　Jul. 28, 2026

(54) HUMANOID ROBOT

(71) Applicant: APPTRONIK, INC., Austin, TX (US)

(72) Inventors: Paul Gloninger Fleury, Austin, TX (US); Bradley Aaron Resh, Austin, TX (US); Joseph Michael Young, Riverside, CA (US); Jonas Alexan Fox, Austin, TX (US); Nicholas Arden Paine, Austin, TX (US)

(73) Assignee: Apptronik, Inc., Austin, TX (US)

( * ) Notice: Subject to any disclaimer, the term of this patent is extended or adjusted under 35 U.S.C. 154(b) by 0 days.

(21) Appl. No.: 19/239,145

(22) Filed: Jun. 16, 2025

(65) Prior Publication Data

US 2025/0360978 A1　　Nov. 27, 2025

Related U.S. Application Data

(63) Continuation of application No. 19/138,007, filed as application No. PCT/US2023/083635 on Dec. 12, 2023.

(60) Provisional application No. 63/431,895, filed on Dec. 12, 2022.

(51) Int. Cl.
　　　*B25J 9/10*　　　　　(2006.01)
　　　*B25J 9/12*　　　　　(2006.01)
　　　*B25J 9/16*　　　　　(2006.01)
　　　*B25J 17/02*　　　　(2006.01)
　　　*B62D 57/032*　　　(2006.01)

(52) U.S. Cl.
　　　CPC ............ *B62D 57/032* (2013.01); *B25J 9/102* (2013.01); *B25J 9/123* (2013.01); *B25J 9/1666* (2013.01); *B25J 9/1697* (2013.01); *B25J 17/02* (2013.01)

(58) Field of Classification Search
CPC ..... B25J 9/123; B25J 17/02; B25J 9/14; B25J 15/10; B25J 15/02
See application file for complete search history.

(56) References Cited

U.S. PATENT DOCUMENTS

| | | | |
|---|---|---|---|
| 6,067,868 A | 5/2000 | Nakamura et al. | |
| 7,241,070 B2 * | 7/2007 | McMurtry | ............ B25J 9/0072 |
| | | | 403/57 |
| 8,495,924 B2 | 7/2013 | Fukano et al. | |

(Continued)

FOREIGN PATENT DOCUMENTS

| | | |
|---|---|---|
| CN | 112775953 A | 5/2021 |
| DE | 19519948 A1 | 12/1996 |

(Continued)

OTHER PUBLICATIONS

International Search Report and Written Opinion in International Appln. No. PCT/US2023/083635, mailed on Apr. 26, 2024, 14 pages.

(Continued)

*Primary Examiner* — Zakaria Elahmadi

(74) *Attorney, Agent, or Firm* — Fish & Richardson P.C.

(57)　　　　　　　ABSTRACT

A method of operating a robot includes operating a robot that includes a body assembly that includes a frame formed of at least one body joint assembly, and at least one pair of joint linear actuators that form the at least one body joint. The method further includes controlling the at least one pair of joint linear actuators to operate in combination to adjust the at least one body joint assembly in two degrees of freedom through differential linear actuation.

52 Claims, 33 Drawing Sheets

(56) References Cited

U.S. PATENT DOCUMENTS

| | | | |
|---|---|---|---|
| 8,875,594 B2 | 11/2014 | Alfayad et al. | |
| 9,080,918 B2 | 7/2015 | Fishel et al. | |
| 9,375,851 B2 | 6/2016 | Nagatsuka | |
| 10,144,464 B1 * | 12/2018 | Buerger | F16H 9/04 |
| 11,312,012 B2 | 4/2022 | Kaehler | |
| 11,461,867 B2 | 10/2022 | Gildert et al. | |
| 11,478,927 B1 | 10/2022 | Kranski et al. | |
| 11,625,122 B2 | 4/2023 | Kranski et al. | |
| 11,636,398 B2 | 4/2023 | Kranski et al. | |
| 11,639,004 B2 | 5/2023 | Khadivinassab et al. | |
| 11,691,270 B2 | 7/2023 | Shannon | |
| 11,691,274 B2 | 7/2023 | Kaehler | |
| 11,691,278 B2 | 7/2023 | Kranski et al. | |
| 11,717,963 B2 | 8/2023 | Gildert et al. | |
| 11,717,974 B1 | 8/2023 | Gildert et al. | |
| 11,787,049 B2 | 10/2023 | Gildert et al. | |
| 11,787,050 B1 | 10/2023 | Kaehler et al. | |
| 11,812,126 B2 | 11/2023 | Hill et al. | |
| 11,848,014 B2 | 12/2023 | Peck | |
| 11,865,703 B2 | 1/2024 | Shannon et al. | |
| 11,867,574 B1 | 1/2024 | Fishel et al. | |
| 11,913,562 B2 | 2/2024 | Sterling et al. | |
| 11,931,894 B1 | 3/2024 | Rose et al. | |
| 11,938,634 B2 | 3/2024 | Gildert et al. | |
| 11,999,063 B1 | 6/2024 | Rose et al. | |
| 12,011,867 B2 | 6/2024 | Sterling et al. | |
| 12,030,196 B2 | 7/2024 | Gildert | |
| 12,066,347 B2 | 8/2024 | Wu et al. | |
| 12,099,343 B2 | 9/2024 | Kaehler | |
| 12,122,040 B2 | 10/2024 | Gildert et al. | |
| 12,124,651 B2 | 10/2024 | Kranski et al. | |
| 12,129,944 B2 | 10/2024 | Sterling et al. | |
| 12,138,809 B2 | 11/2024 | Rose | |
| 12,145,266 B2 | 11/2024 | Rose et al. | |
| 12,157,226 B2 | 12/2024 | Kranski et al. | |
| 12,162,138 B2 | 12/2024 | Shannon | |
| 12,162,153 B2 | 12/2024 | Rose et al. | |
| 12,172,297 B2 | 12/2024 | Khadivinassab et al. | |
| 12,172,307 B2 | 12/2024 | Shannon et al. | |
| 12,172,317 B2 | 12/2024 | Kaehler et al. | |
| 12,172,327 B2 | 12/2024 | Gildert | |
| 2005/0113973 A1 * | 5/2005 | Endo | B25J 9/161 |
| | | | 700/245 |
| 2018/0031091 A1 | 2/2018 | Wu | |
| 2018/0172121 A1 | 6/2018 | Potter et al. | |
| 2019/0240832 A1 * | 8/2019 | Kawaguchi | F15B 11/10 |
| 2021/0122035 A1 | 4/2021 | Furlan | |
| 2021/0307170 A1 | 9/2021 | Wu et al. | |
| 2022/0101477 A1 | 3/2022 | Gildert et al. | |
| 2022/0105643 A1 | 4/2022 | Shannon | |
| 2022/0105644 A1 | 4/2022 | Shannon | |
| 2022/0314435 A1 | 10/2022 | Wales et al. | |
| 2022/0314448 A1 | 10/2022 | Wales et al. | |
| 2022/0324113 A1 | 10/2022 | Rose | |
| 2022/0324114 A1 | 10/2022 | Rose | |
| 2022/0355485 A1 | 11/2022 | Rose | |
| 2022/0355486 A1 | 11/2022 | Rose | |
| 2022/0355487 A1 | 11/2022 | Rose | |
| 2022/0371183 A1 | 11/2022 | Shannon et al. | |
| 2022/0390045 A1 | 12/2022 | Sterling et al. | |
| 2022/0402126 A1 | 12/2022 | Gildert | |
| 2022/0404835 A1 | 12/2022 | Gildert | |
| 2023/0023985 A1 | 1/2023 | Shannon | |
| 2023/0053753 A1 | 2/2023 | Gildert et al. | |
| 2023/0054297 A1 | 2/2023 | Gildert et al. | |
| 2023/0056745 A1 | 2/2023 | Gildert et al. | |
| 2023/0078625 A1 | 3/2023 | Kaehler et al. | |
| 2023/0083349 A1 | 3/2023 | Kranski et al. | |
| 2023/0085731 A1 | 3/2023 | Shannon et al. | |
| 2023/0111067 A1 | 4/2023 | Gildert et al. | |
| 2023/0111284 A1 | 4/2023 | Gildert et al. | |
| 2023/0114376 A1 | 4/2023 | Gildert et al. | |
| 2023/0122611 A1 | 4/2023 | Rose | |
| 2023/0148120 A1 | 5/2023 | Kranski et al. | |
| 2023/0150135 A1 | 5/2023 | Shannon | |

| | | | |
|---|---|---|---|
| 2023/0202028 A1 | 6/2023 | Gildert et al. | |
| 2023/0202029 A1 | 6/2023 | Shannon | |
| 2023/0202038 A1 | 6/2023 | Gildert et al. | |
| 2023/0205291 A1 | 6/2023 | Shannon | |
| 2023/0205292 A1 | 6/2023 | Shannon | |
| 2023/0211507 A1 | 7/2023 | Shannon | |
| 2023/0237378 A1 | 7/2023 | Kranski et al. | |
| 2023/0278201 A1 | 9/2023 | Gildert | |
| 2023/0278202 A1 | 9/2023 | Gildert | |
| 2023/0278223 A1 | 9/2023 | Gildert | |
| 2023/0297186 A1 | 9/2023 | O'Rourke | |
| 2023/0302659 A1 | 9/2023 | Lee et al. | |
| 2023/0302660 A1 | 9/2023 | Lee et al. | |
| 2023/0302661 A1 | 9/2023 | Martin | |
| 2023/0311316 A1 | 10/2023 | Gildert et al. | |
| 2023/0333593 A1 | 10/2023 | Meier | |
| 2023/0339104 A1 | 10/2023 | Kaehler | |
| 2023/0364806 A1 | 11/2023 | Lee et al. | |
| 2023/0364807 A1 | 11/2023 | Lee et al. | |
| 2023/0364808 A1 | 11/2023 | Lee et al. | |
| 2023/0381957 A1 | 11/2023 | Gildert et al. | |
| 2023/0381958 A1 | 11/2023 | Gildert et al. | |
| 2024/0033921 A1 | 2/2024 | Moore et al. | |
| 2024/0033922 A1 | 2/2024 | Moore et al. | |
| 2024/0037848 A1 | 2/2024 | Moore et al. | |
| 2024/0046572 A1 | 2/2024 | Moore et al. | |
| 2024/0046573 A1 | 2/2024 | Moore et al. | |
| 2024/0096003 A1 | 3/2024 | Gildert et al. | |
| 2024/0096004 A1 | 3/2024 | Gildert et al. | |
| 2024/0096005 A1 | 3/2024 | Gildert et al. | |
| 2024/0109612 A1 | 4/2024 | Gildert | |
| 2024/0175516 A1 | 5/2024 | Foroughi et al. | |
| 2024/0181647 A1 | 6/2024 | Gildert et al. | |
| 2024/0198541 A1 * | 6/2024 | Kew | B25J 19/0025 |
| 2024/0208082 A1 | 6/2024 | Shannon et al. | |
| 2024/0217096 A1 | 7/2024 | Maleki et al. | |
| 2024/0246231 A1 | 7/2024 | Gildert et al. | |
| 2024/0253211 A1 | 8/2024 | Rose et al. | |
| 2024/0253212 A1 | 8/2024 | Rose et al. | |
| 2024/0253220 A1 | 8/2024 | Wells et al. | |
| 2024/0253221 A1 | 8/2024 | Gidert | |
| 2024/0253222 A1 | 8/2024 | Gidert | |
| 2024/0253239 A1 | 8/2024 | Gidert | |
| 2024/0253243 A1 | 8/2024 | Gidert | |
| 2024/0256794 A1 | 8/2024 | Gidert | |
| 2024/0278435 A1 | 8/2024 | Gildert | |
| 2024/0280967 A1 | 8/2024 | Wells et al. | |
| 2024/0286280 A1 | 8/2024 | Karimi Eskandary et al. | |
| 2024/0294219 A1 | 9/2024 | Gildert et al. | |
| 2024/0294220 A1 | 9/2024 | Gildert et al. | |
| 2024/0300115 A1 | 9/2024 | Rose et al. | |
| 2024/0316759 A1 | 9/2024 | Maleki et al. | |
| 2024/0316761 A1 | 9/2024 | Rose et al. | |
| 2024/0316795 A1 | 9/2024 | Hill et al. | |
| 2024/0316796 A1 | 9/2024 | Maleki et al. | |
| 2024/0351211 A1 | 10/2024 | Shannon et al. | |
| 2024/0351212 A1 | 10/2024 | Shannon et al. | |
| 2024/0359319 A1 | 10/2024 | Rose et al. | |
| 2024/0359331 A1 | 10/2024 | Gildert | |
| 2024/0367316 A1 | 11/2024 | Gildert et al. | |
| 2024/0367317 A1 | 11/2024 | Gildert et al. | |
| 2024/0375299 A1 | 11/2024 | Shannon et al. | |
| 2024/0393190 A1 | 11/2024 | Fishel et al. | |
| 2025/0001611 A1 | 1/2025 | Gildert | |
| 2025/0001612 A1 | 1/2025 | Gildert | |
| 2025/0001613 A1 | 1/2025 | Gildert | |
| 2025/0050495 A1 | 2/2025 | Gildert et al. | |
| 2025/0050496 A1 | 2/2025 | Gildert et al. | |
| 2025/0050497 A1 | 2/2025 | Gildert et al. | |

FOREIGN PATENT DOCUMENTS

| | | | | |
|---|---|---|---|---|
| JP | 2004017248 A | 1/2004 | | |
| KR | 102333782 B1 * | 12/2021 | | B25J 9/1694 |
| WO | WO 2022174344 A1 | 8/2022 | | |
| WO | WO 2022217346 A1 | 10/2022 | | |
| WO | WO 2022232934 A1 | 11/2022 | | |
| WO | WO 2022241570 A1 | 11/2022 | | |
| WO | WO 2023015383 A1 | 2/2023 | | |

(56)     References Cited

FOREIGN PATENT DOCUMENTS

| WO | WO 2023082013 | A1 | 5/2023 |
| WO | WO 2023122834 | A1 | 7/2023 |
| WO | WO 2023164781 | A1 | 9/2023 |
| WO | WO 2023235977 | A1 | 12/2023 |
| WO | WO 2024065045 | A1 | 4/2024 |
| WO | WO 2024113059 | A1 | 6/2024 |
| WO | WO 2024119268 | A1 | 6/2024 |
| WO | WO 2024130449 | A1 | 6/2024 |
| WO | WO 2024159308 | A1 | 8/2024 |
| WO | WO 2024159310 | A1 | 8/2024 |
| WO | WO 2024159311 | A1 | 8/2024 |
| WO | WO 2024159312 | A1 | 8/2024 |
| WO | WO 2024168420 | A3 | 8/2024 |
| WO | WO 2024182899 | A1 | 9/2024 |
| WO | WO 2024239110 | A1 | 11/2024 |

OTHER PUBLICATIONS

Extended European Search Report in Appln. No. 25193536.7, mailed on Sep. 24, 2025, 10 pages.
International Preliminary Report on Patentability in International Appln. No. PCT/US2023/083635, mailed on Jun. 26, 2025, 8 pages.

* cited by examiner

100

100

100

100

100

100

100

101

1105

1105

101

1110

1200

1200

1210

HUMANOID ROBOT

CROSS-REFERENCE TO RELATED APPLICATIONS

This application is a continuation of, and claims priority under 35 U.S.C. § 120 to, U.S. patent application Ser. No. 19/138,007, filed on Jun. 11, 2025, which is a National Stage application under 35 U.S.C. § 371 of International Application No. PCT/US2023/083635, having an International Filing Date of Dec. 12, 2023, which claims priority to U.S. Provisional Patent Application No. 63/431,895, filed Dec. 12, 2022. The disclosure of the prior applications are considered part of the disclosure of this application and are incorporated by reference in their entirety into this application.

STATEMENT REGARDING FEDERALLY SPONSORED RESEARCH OR DEVELOPMENT

This invention was made with government support under Contract Number 80NSSC22CA190 awarded by The National Aeronautics and Space Administration (NASA). The government has certain rights in the invention.

TECHNICAL FIELD

The present disclosure describes example implementations of humanoid robots.

BACKGROUND

Humanoid robots have a body shape that resembles at least portions of the human body. The human envelope, however, limits the volume available for housing the actuators used to move the limbs, head, etc. of the robot. Because larger actuators generally provide better performance, there is a tradeoff between shape and performance—that is, there is a tradeoff between using actuators that are small enough to allow the robot to generally fit within the human envelope and the performance of the robot.

SUMMARY

In an example implementation, a robot includes a body assembly that includes a frame formed of at least one body joint assembly; and at least one pair of joint linear actuators that form the at least one body joint, the at least one pair of joint linear actuators configured to operate in combination to adjust the at least one body joint assembly in two degrees of freedom through differential linear actuation.

In an aspect combinable with the example implementation, the body assembly includes a torso assembly that includes at least a portion of the frame; at least one upper body joint assembly of the at least one body joint assembly; and at least one pair of upper body linear actuators of the at least one pair of joint linear actuators, the at least one pair of upper body linear actuators configured to operate in combination to adjust the upper body joint assembly in two degrees of freedom through differential linear actuation.

In another aspect combinable with any of the previous aspects, the body assembly includes a base assembly that includes at least another portion of the frame; at least one lower body joint assembly of the at least one body joint assembly; and at least one pair of lower body linear actuators of the at least one pair of joint linear actuators, the pair of lower body linear actuators configured to operate in combination to adjust the lower body joint assembly in two degrees of freedom through differential linear actuation.

In another aspect combinable with any of the previous aspects, the base assembly is coupled to the torso assembly.

In another aspect combinable with any of the previous aspects, the at least one upper body joint assembly includes at least six upper body joint assemblies, with each of the at least six upper body joint assemblies including a pair of upper body linear actuators.

In another aspect combinable with any of the previous aspects, the at least six upper body joint assemblies include: a first shoulder joint assembly, a second shoulder joint assembly, a first wrist joint assembly, a second wrist joint assembly, a neck joint assembly, and a torso joint assembly.

In another aspect combinable with any of the previous aspects, each of the first and second shoulder joint assemblies includes a pair of upper body linear actuators configured to operate in combination to adjust the respective shoulder joint assembly in two degrees of shoulder freedom through differential linear actuation, the two degrees of shoulder freedom including roll and yaw.

In another aspect combinable with any of the previous aspects, the torso joint assembly includes a pair of upper body linear actuators configured to operate in combination to adjust the torso joint assembly in two degrees of torso freedom through differential linear actuation, the two degrees of torso freedom including roll and pitch.

In another aspect combinable with any of the previous aspects, the at least one lower body joint assembly includes at least four lower body joint assemblies, with each of the at least four lower body joint assemblies including a pair of lower body linear actuators.

In another aspect combinable with any of the previous aspects, the at least four lower body joint assemblies include: a first ankle joint assembly, a second ankle joint assembly, a first hip joint assembly, and a second hip joint assembly.

In another aspect combinable with any of the previous aspects, each of the first and second ankle joint assemblies includes a pair of lower body linear actuators configured to operate in combination to adjust the respective ankle joint assembly in two degrees of ankle freedom through differential linear actuation, the two degrees of ankle freedom including roll and pitch.

In another aspect combinable with any of the previous aspects, each of the first and second hip joint assemblies includes a pair of lower body linear actuators configured to operate in combination to adjust the respective hip joint assembly in two degrees of hip freedom through differential linear actuation, the two degrees of hip freedom including roll and pitch.

In another aspect combinable with any of the previous aspects, the at least one lower body joint assembly includes a first thigh assembly and a second thigh assembly.

In another aspect combinable with any of the previous aspects, each of the first thigh assembly and the second thigh assembly includes a pair of lower body linear actuators; and a thigh linear actuator positioned with the pair of lower body linear actuators and configured to adjust, in combination with the pair of lower body linear actuators, the respective first or second thigh assembly in two degrees of freedom through differential linear actuation.

In another aspect combinable with any of the previous aspects, each of the joint linear actuators includes a quasi-direct drive (QDD) linear actuator.

In another aspect combinable with any of the previous aspects, the QDD linear actuator includes a low gear ratio QDD linear actuator.

In another aspect combinable with any of the previous aspects, the low gear ratio QDD linear actuator includes a gear ratio of between 10:1 and 50:1.

In another aspect combinable with any of the previous aspects, the low gear ratio QDD linear actuator includes at least one screw configured to facilitate a speed reduction.

Another aspect combinable with any of the previous aspects further includes a first motor controller communicably coupled to each upper body linear actuator of the at least one pair of upper body linear actuators; and a second motor controller communicably coupled to each lower body linear actuator of the at least one pair of lower body linear actuators.

In another aspect combinable with any of the previous aspects, each of the first and second motor controllers includes a direct current (DC) motor controller.

In another aspect combinable with any of the previous aspects, the first motor controller is configured to operate, based on a first signal, the at least one pair of upper body linear actuators in combination to adjust the at least one upper body joint assembly in two degrees of freedom through differential linear actuation.

In another aspect combinable with any of the previous aspects, the second motor controller is configured to operate, based on a second signal, the at least one pair of lower body linear actuators in combination to adjust the at least one lower body joint assembly in two degrees of freedom through differential linear actuation.

Another aspect combinable with any of the previous aspects further includes a brain that includes one or more hardware processors, one or more memory modules, and one or more sensors.

In another aspect combinable with any of the previous aspects, the one or more sensors includes at least one inertial measurement unit, and at least one image sensor.

In another aspect combinable with any of the previous aspects, the brain is configured to perform operations, including detecting, with the at least one image sensor, an obstacle proximate to the body assembly; generating, with the at least one inertial measurement unit, at least one signal; providing the at least one signal to a motor controller coupled to the at least one pair of joint linear actuators; and operating, based on the at least one signal, the at least one pair of joint linear actuators with the motor controller to adjust the at least one body joint assembly.

In another aspect combinable with any of the previous aspects, the robot is a humanoid robot.

In another example implementation, a method of operating a robot includes operating a robot that includes a body assembly that includes a frame formed of at least one body joint assembly, and at least one pair of joint linear actuators that form the at least one body joint.

The method further includes controlling the at least one pair of joint linear actuators to operate in combination to adjust the at least one body joint assembly in two degrees of freedom through differential linear actuation.

In an aspect combinable with the example implementation, the body assembly includes a torso assembly that includes at least a portion of the frame; at least one upper body joint assembly of the at least one body joint assembly; and at least one pair of upper body linear actuators of the at least one pair of joint linear actuators, the at least one pair of upper body linear actuators configured to operate in combination to adjust the upper body joint assembly in two degrees of freedom through differential linear actuation.

In another aspect combinable with any of the previous aspects, the body assembly includes a base assembly that includes at least another portion of the frame; at least one lower body joint assembly of the at least one body joint assembly; and at least one pair of lower body linear actuators of the at least one pair of joint linear actuators, the pair of lower body linear actuators configured to operate in combination to adjust the lower body joint assembly in two degrees of freedom through differential linear actuation.

In another aspect combinable with any of the previous aspects, the base assembly is coupled to the torso assembly In another aspect combinable with any of the previous aspects, the at least one upper body joint assembly includes at least six upper body joint assemblies, with each of the at least six upper body joint assemblies including a pair of upper body linear actuators.

In another aspect combinable with any of the previous aspects, the at least six upper body joint assemblies include: a first shoulder joint assembly, a second shoulder joint assembly, a first wrist joint assembly, a second wrist joint assembly, a neck joint assembly, and a torso joint assembly.

In another aspect combinable with any of the previous aspects, each of the first and second shoulder joint assemblies includes a pair of upper body linear actuators configured to operate in combination to adjust the respective shoulder joint assembly in two degrees of shoulder freedom through differential linear actuation, the two degrees of shoulder freedom including roll and yaw.

In another aspect combinable with any of the previous aspects, the torso joint assembly includes a pair of upper body linear actuators configured to operate in combination to adjust the torso joint assembly in two degrees of torso freedom through differential linear actuation, the two degrees of torso freedom including roll and pitch.

In another aspect combinable with any of the previous aspects, the at least one lower body joint assembly includes at least four lower body joint assemblies, with each of the at least four lower body joint assemblies including a pair of lower body linear actuators.

In another aspect combinable with any of the previous aspects, the at least four lower body joint assemblies include: a first ankle joint assembly, a second ankle joint assembly, a first hip joint assembly, and a second hip joint assembly.

In another aspect combinable with any of the previous aspects, each of the first and second ankle joint assemblies includes a pair of lower body linear actuators configured to operate in combination to adjust the respective ankle joint assembly in two degrees of ankle freedom through differential linear actuation, the two degrees of ankle freedom including roll and pitch.

In another aspect combinable with any of the previous aspects, each of the first and second hip joint assemblies includes a pair of lower body linear actuators configured to operate in combination to adjust the respective hip joint assembly in two degrees of hip freedom through differential linear actuation, the two degrees of hip freedom including roll and pitch.

In another aspect combinable with any of the previous aspects, the at least one lower body joint assembly includes a first thigh assembly and a second thigh assembly.

In another aspect combinable with any of the previous aspects, each of the first thigh assembly and the second thigh assembly includes a pair of lower body linear actuators; and a thigh linear actuator positioned with the pair of lower body linear actuators and configured to adjust, in combination with the pair of lower body linear actuators, the respective first or second thigh assembly in two degrees of freedom through differential linear actuation.

In another aspect combinable with any of the previous aspects, each of the joint linear actuators includes a quasi-direct drive (QDD) linear actuator.

In another aspect combinable with any of the previous aspects, the QDD linear actuator includes a low gear ratio QDD linear actuator.

In another aspect combinable with any of the previous aspects, the low gear ratio QDD linear actuator includes a gear ratio of between 10:1 and 50:1.

In another aspect combinable with any of the previous aspects, the low gear ratio QDD linear actuator includes at least one screw configured to facilitate a speed reduction.

Another aspect combinable with any of the previous aspects further includes operating a first motor controller communicably coupled to each upper body linear actuator of the at least one pair of upper body linear actuators; and operating a second motor controller communicably coupled to each lower body linear actuator of the at least one pair of lower body linear actuators.

In another aspect combinable with any of the previous aspects, each of the first and second motor controllers includes a direct current (DC) motor controller.

Another aspect combinable with any of the previous aspects further includes operating the first motor controller to operate, based on a first signal, to operate the at least one pair of upper body linear actuators in combination to adjust the at least one upper body joint assembly in two degrees of freedom through differential linear actuation.

Another aspect combinable with any of the previous aspects further includes operating the second motor controller, based on a second signal, to operate the at least one pair of lower body linear actuators in combination to adjust the at least one lower body joint assembly in two degrees of freedom through differential linear actuation.

In another aspect combinable with any of the previous aspects, the robot further includes a brain that includes one or more hardware processors, one or more memory modules, and one or more sensors.

In another aspect combinable with any of the previous aspects, the one or more sensors includes at least one inertial measurement unit, and at least one image sensor.

Another aspect combinable with any of the previous aspects further includes detecting, with the at least one image sensor, an obstacle proximate to the body assembly; generating, with the at least one inertial measurement unit, at least one signal; providing the at least one signal to a motor controller coupled to the at least one pair of joint linear actuators; and operating, based on the at least one signal, the at least one pair of joint linear actuators with the motor controller to adjust the at least one body joint assembly.

In another aspect combinable with any of the previous aspects, the robot is a humanoid robot.

Implementations of a humanoid robot (or portions thereof) according to the present disclosure can include one, some, or all of the following features. For example, a humanoid robot according to the present disclosure can have an improved sense of balance as compared to traditional general purpose robots (GPRs) which result from slow, brittle, non-robust locomotion. As another example, a humanoid robot according to the present disclosure can provide for a more human-like gait that is able to react to disturbances or realistic variation in terrain as compared to traditional GPRs that have used a statically stable form of locomotion (sometimes called zero moment point (ZMP) walking), primarily relying on large feet and a scripted/pre-planned gait. As another example, a humanoid robot according to the present disclosure can provide for a backdriveable actuation scheme to survive collisions and other contacts with the environment. Further, a humanoid robot according to the present disclosure can provide for efficient a longer runtime (e.g., from one or more batteries) by minimizing friction in the actuation system and other losses. Also, a humanoid robot according to the present disclosure can provide for a more sleek and "human-like" shape and form factor that allow it to fit, move, and work in environments in which humans typically exist. As another example, a humanoid robot according to the present disclosure includes human-like kinematics, which allow for utility in many of the same situations where humans can fit. As another example, a humanoid robot according to the present disclosure can have good and improved payload to mass ratio and can be more efficient to produce and manufacture.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Part of what makes many robots appear strange or unfamiliar is that they lack human proportions. Embodiments described herein provide an upper-body humanoid robot for use in human made environments. More particularly, embodiments may fit within a desired percentage of a human envelope. For example, some embodiments fit within a human envelope with less than 25% deviation, and even more preferably, with less than 20% deviation in torso length, shoulder width, bicep length and forearm length.

The human envelope may be defined by a set of proportions, such as described in Biomechanics and Motor Control of Human Movement, David A. Winter, Wiley; 4th edition (Oct. 12, 2009). Embodiments of a humanoid robot according to the present disclosure may also exhibit natural, anthropomorphic motion and dexterous environmental interactions. Further, embodiments described herein can include a compact mechanical layout, a wire routing scheme that reduces external wiring and stress on wiring, and/or compact embedded electronics distributed in a manner to enhance cable management.

Figure 1A:
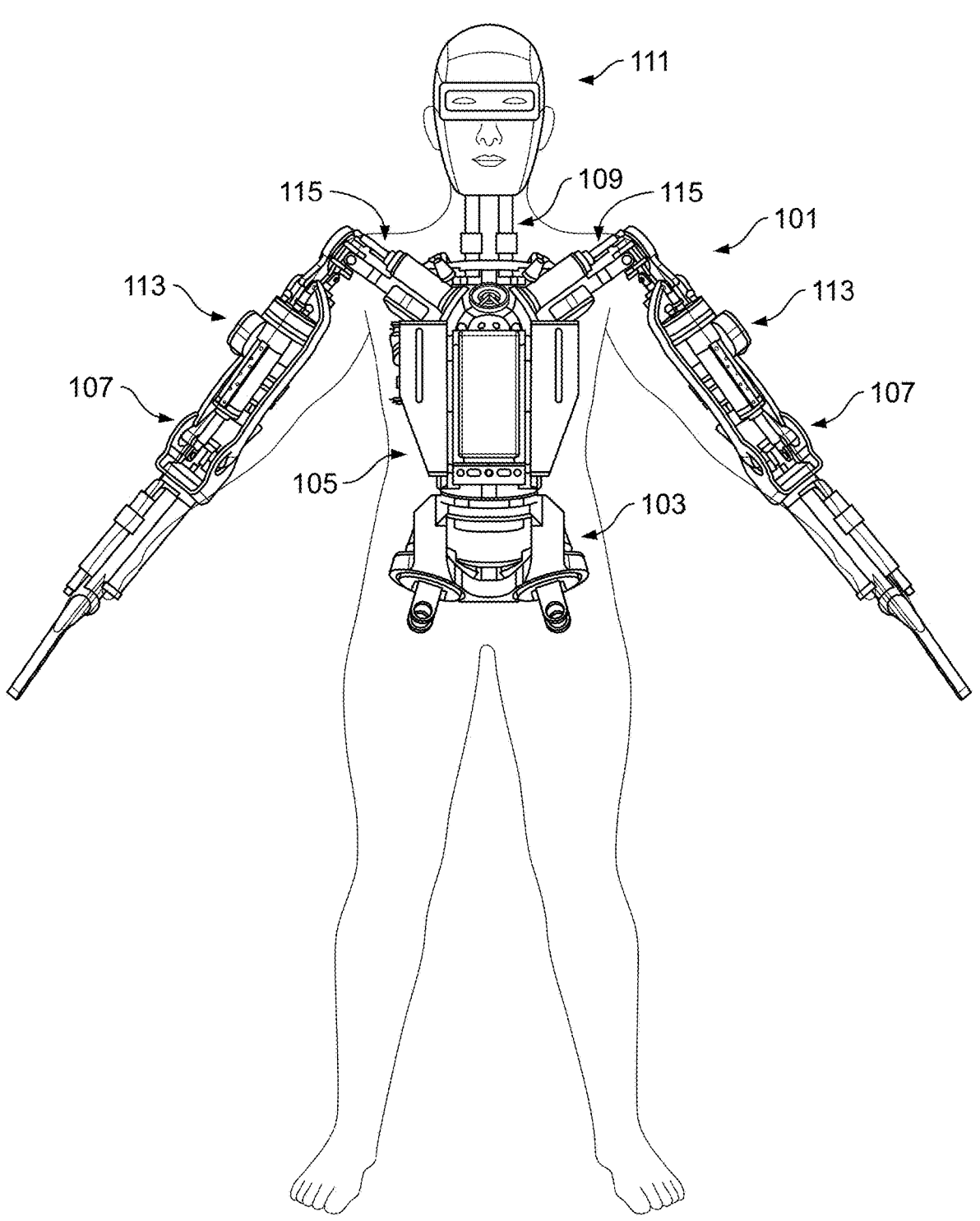
FIGS. 1A and 1B are schematic illustrations of an upper body assembly and lower body assembly, respectively, of an example implementation of a humanoid robot according to the present disclosure.
Figure 1B:
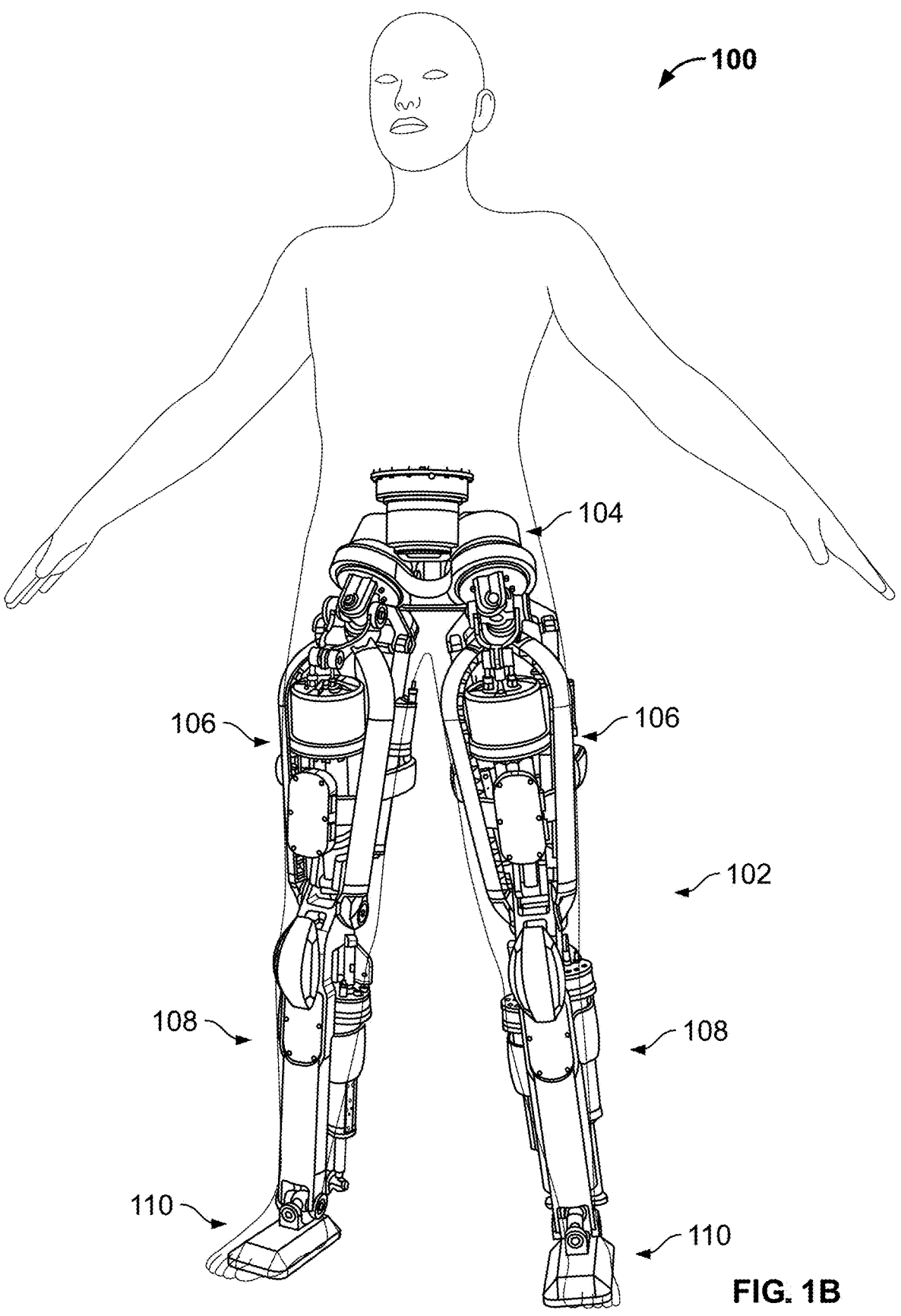

FIGS. 1A and 1B are schematic illustrations of an upper body assembly 101 and lower body assembly 102, respectively, of an example implementation of a humanoid robot 100 (that includes one or both of the assemblies 101 and 102) according to the present disclosure. Generally, humanoid robot 100 comprises a general purpose robot product that performs useful work in the real world (without the use of emotions) such as tasks that involve dangerous, hazardous, or even normal day-to-day tasks incapable (or capable) of being performed by a human being. Example tasks can include handling dangerous or hazardous materials (e.g., munitions, radioactive material, chemical material), loading and unloading (e.g., items or objects that are immovable or otherwise by a single or multiple human beings), or tasks performed in hazardous or dangerous environments.

In the present disclosure, the term "humanoid robot" can refer to a robot that is generally human in shape, e.g., with a torso, a trunk, two torso appendages (i.e., arms/hands), trunk appendages (i.e., legs/feet), and a head or skull appendage. However, the term "humanoid robot" can also refer to a robot that resembles just a portion of a human, such as only a torso with torso appendages, or only a trunk with trunk appendages. In addition, the present disclosure describes aspects of a humanoid robot (such as, for example, pairs of linear actuators that form a joint assembly or part of an appendage and operate in combination to adjust the joint assembly or appendage in two degrees of freedom through differential linear actuation) that can be applied in non-humanoid robots, such as quadruped robots or otherwise.

Humanoid robot 100 can be autonomously controlled (untethered to any external control system) or human-controlled (e.g., tethered or wirelessly) to perform tasks. For example, humanoid robot 100 can perform useful work with mobility and kinematic movement that at least partially mimics that of a human being, and in spaces occupied by humans or not. The humanoid robot 100, in some aspects, is designed for practical portability and movement and for mass production.

The humanoid robot 100 can perform at various levels of autonomy. For example, example implementations of the humanoid robot 100 can be enabled for untethered locomotion testing, with some limited manipulation capabilities. In some aspects, example implementations of the humanoid robot 100 can be configured for full manipulation and locomotion.

As shown in FIG. 1A, the example implementation of the humanoid robot 100 includes upper body assembly 101. In some aspects, the upper body assembly 101 comprises the whole of the humanoid robot 100 (i.e., humanoid robot 100 does not include lower body assembly 102). Upper body assembly 101, in this example, includes a pelvic assembly 103, a torso assembly 105, shoulder assemblies 115, upper arm assemblies 113, lower arm assemblies 107, neck assembly 109, and a head assembly 111. Generally, one, some, or all of the illustrated assemblies comprise pairs of linear actuators that work by differential linear actuation to adjust or move the assembly in at least two degrees of freedom (as explained in more detail herein).

As shown in FIG. 1B, the example implementation of the humanoid robot 100 includes lower body assembly 102. In some aspects, the lower body assembly 102 comprises the whole of the humanoid robot 100 (i.e., humanoid robot 100 does not include upper body assembly 101). In example implementations, the humanoid robot 100 includes both upper body assembly 101 and lower body assembly 102 that are coupled together to form a fully humanoid robotic system. Lower body assembly 102, in this example, includes a hip assembly 104 (that couples to the pelvic assembly 103), upper leg assemblies 106, lower leg assemblies 108, and foot assemblies 110 (that in some aspects are part of the lower leg assemblies 108). Generally, one, some, or all of the illustrated assemblies comprise pairs of linear actuators that work by differential linear actuation to adjust or move the assembly in at least two degrees of freedom (as explained in more detail herein). In some aspects, each upper leg assembly 106 includes a pair of linear actuators in combination with a third linear actuator (as described more fully herein).

Figure 2:
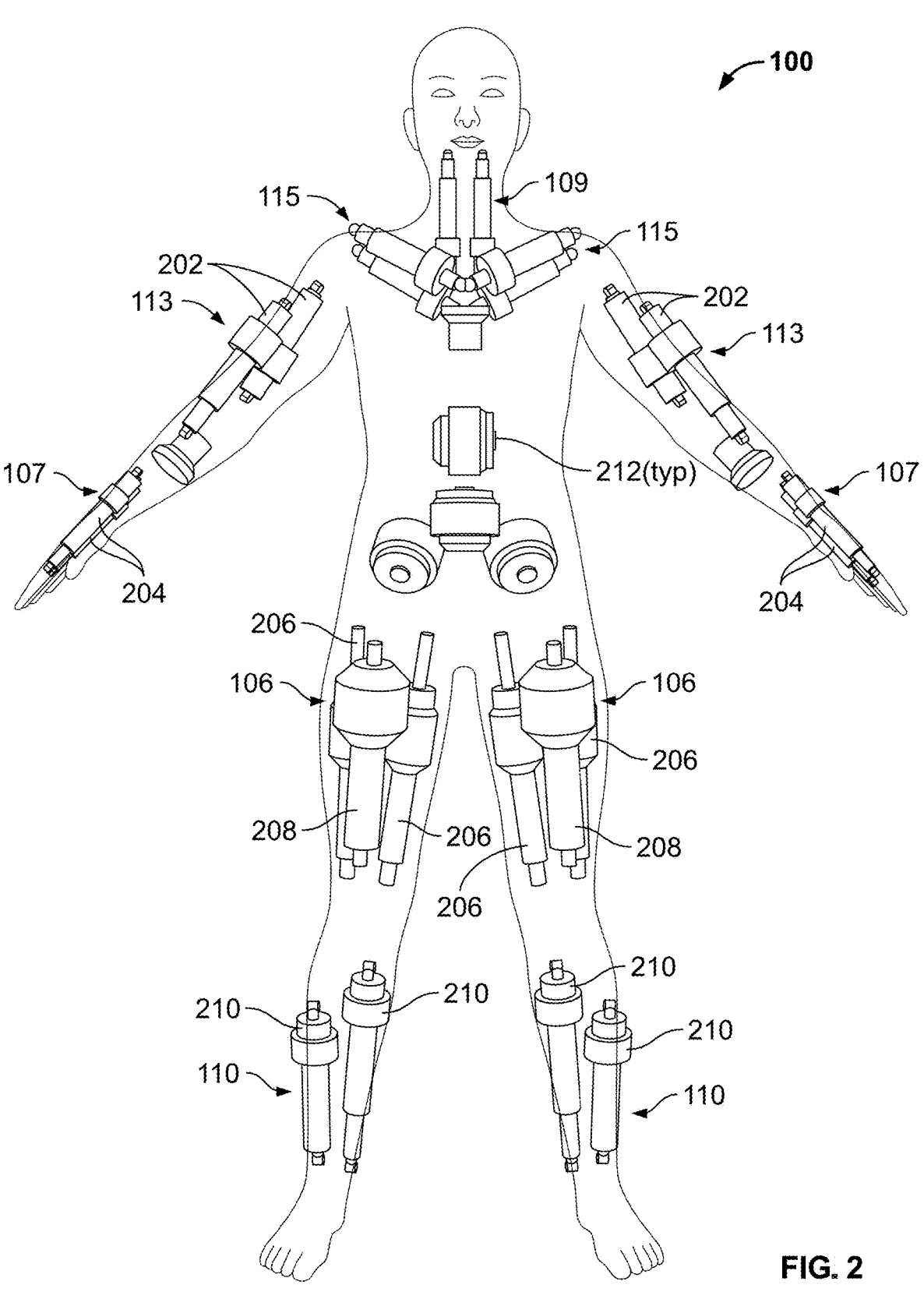
FIG. 2 is a schematic illustration of all or a portion of sets of linear actuator pairs of an upper body assembly and lower body assembly of an example implementation of a humanoid robot according to the present disclosure.

FIG. 2 is a schematic illustration of all or a portion of sets of linear actuator pairs of the upper body assembly 101 and lower body assembly 102 of the example implementation of the humanoid robot 100 according to the present disclosure. As shown in this figure, several of the assemblies described with reference to FIGS. 1A and 1B are comprises of linear actuator pairs that operate through differential linear actuation to move or adjust the assembly (and thus, the humanoid robot 100) based on autonomous commands, external (e.g., human provided) commands, and/or external stimuli (e.g., objects or obstacles in a field of view).

As shown in FIG. 2, the neck assembly 109 includes a pair of linear actuators (not labeled). Each shoulder assembly 115 includes a pair of linear actuators (not labeled). Each upper arm assembly 113 includes a pair of linear actuators 202. Each lower arm assembly 107 includes a pair of linear actuators 204. Each lower leg assembly 108 includes a pair of linear actuators 210. Each upper leg assembly 106 includes a pair of linear actuators 206 as well as a single, thigh linear actuator 208. Various radial actuators 212 are also located in one or more body assemblies of the humanoid robot 100, including the pelvic assembly 103, the hip assembly 104, and at the connection points of the upper arm assemblies 113 and lower arm assemblies 107 (as well as other locations).

The linear actuator pairs described herein (including the pair of linear actuators 206 in combination with thigh linear actuator 208) can be actuated to control movement through differential linear actuation in at least two degrees of freedom. For example, the shoulder assemblies 115 can provide for flexion and extension of the arms of the humanoid robot 100 (e.g., lifting the arm to the front and rear). The shoulder assemblies 115 can provide for abduction and adduction (AA) of the arms of the humanoid robot 100. The upper arm assemblies 113 can provide for internal/external (IE) rotation of the arms of the humanoid robot 100. The combination of the upper and lower arm assemblies 113 and 107 (e.g., in combination with a radial actuator in some aspects) can provide for flexion-extension (FE) of the lower arms of the humanoid robot 100.

In example aspects of the humanoid robot 100, the use (e.g., predominant use) of linear electromechanical actuators (which have desirable performance per cost and manufacturability compared to other forms of actuators) can provide for lower gear ratios (as compare to traditionally used actuators in GPRs), which enable more dynamic behaviors and increases system robustness to environmental collisions/interactions. The kinematic use of linear electromechanical actuators as shown can provide for ordering and mechanisms that enable the humanoid robot 100 to move in a fashion that achieves desired functional attributes such as payloads/torques, speeds, efficiency, human-like form factor, and also sufficient range of motion. The illustrated pairs of linear actuators also possess variable moment for appendages (e.g., legs and/or arms) that mimic the way human muscles work in nature.

In some aspects, each of the illustrated linear actuators can be sized for expected or desired movement and/or force output (e.g., for lifting or otherwise asserting a force to provide for movement of the humanoid robot 100, itself, or of another object). In some aspects, use each of the illustrated linear actuators can use a motor paired with a ball screw for primary (and efficient) speed reduction with a low (e.g., between 10:1 and 50:1) gear ratio. In some aspects each of the illustrated linear actuators can be a quasi-direct drive (QDD) actuator. As described, each pair of the illustrated linear actuators can operate through differential linear actuation, such that one linear actuator of the pair can be controlled (e.g., elongated or shortened) independently of the other linear actuator of the pair.

Figure 11A:
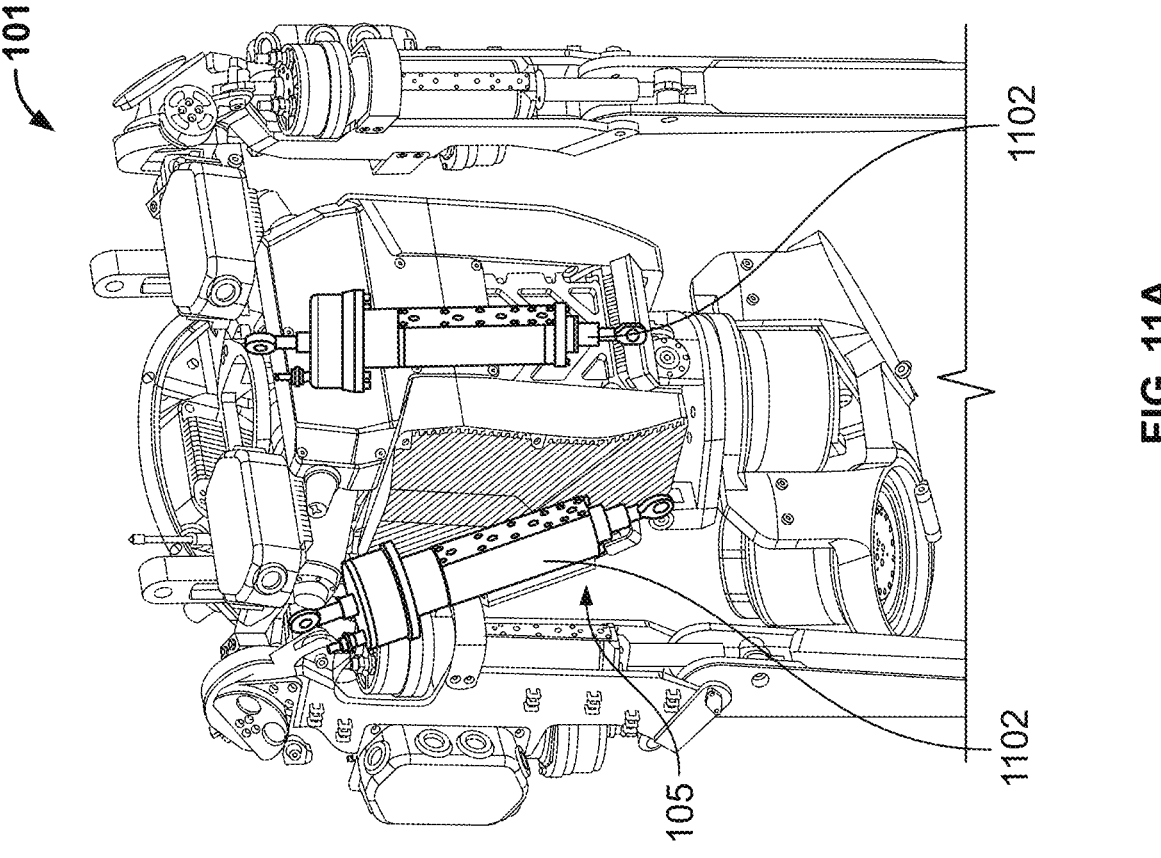
FIGS. 11A-11H are schematic illustrations of an upper body assembly of an example humanoid robot including linear actuators and other control components according to the present disclosure.

As described, each of the illustrated pairs of linear actuators can provide (through differential linear actuation) of at least two degrees of freedom of movement of a particular portion of the humanoid robot 100. For example, two degrees of shoulder freedom of roll and yaw can be provided through differential linear actuation of the pair of linear actuators of shoulder assemblies 115. Two degrees of torso freedom of roll and pitch can be provided through differential linear actuation of the pair of linear actuators 1102 of torso assembly 105 (as shown in FIG. 11A). Two degrees of ankle freedom of roll and pitch can be provided through differential linear actuation of the pair of linear actuators 210 of lower leg assemblies 108. Two degrees of hip freedom of roll and pitch can be provided through differential linear actuation of the pair of linear actuators 206 and thigh linear actuators 208 of upper leg assemblies 106.

The two degrees of freedom of particular assemblies of the humanoid robot 100 can have particular ranges of motions. For example, Table 1 shows example ranges of motions (ROM) for particular degrees of freedom (the values of which are for examples only):

TABLE 1

| Deg. of Freedom | Absolute ROM (+) | Absolute ROM (−) | Working ROM (+) | Working ROM (−) |
|---|---|---|---|---|
| Torso pitch | 20 | −80 | 15 | −75 |
| Torso roll | 15 | −15 | 10 | −10 |

TABLE 1-continued

| Deg. of Freedom | Absolute ROM (+) | Absolute ROM (−) | Working ROM (+) | Working ROM (−) |
|---|---|---|---|---|
| Torso yaw | 50 | −60 | 45 | −45 |
| Shoulder AA | 10 | −95 | 5 | −90 |
| Shoulder IE | 30 | −30 | 25 | −25 |
| Shoulder FE | 35 | −125 | 30 | −120 |
| Elbow FE | 10 | −150 | 5 | −145 |
| Hip IE | 35 | −65 | 30 | −60 |
| Hip AA | −45 | −20 | 40 | −15 |
| Hip FE | 35 | −110 | 30 | −105 |
| Knee FE | 150 | 0 | 145 | 5 |
| Ankle FE | 45 | −90 | 42.5 | −87.5 |
| Ankle IE | 20 | −45 | 15 | −40 |

Each of the particular degrees of freedom shown in Table 1 can have a maximum continuous torque in a range of between about 20 to about 150 Nm. Each of the particular degrees of freedom shown in Table 1 can have a maximum peak torque in a range of between about 75 to about 500 Nm. Each of the particular degrees of freedom shown in Table 1 can have a minimum no-load speed in a range of between about 3 to about 12 radians/sec. Each of the particular degrees of freedom shown in Table 1 can have a maximum gear ratio in a range of between about 20 to about 170. The linear actuators that provide for particular upper body degrees of freedom shown in Table 1 can have a maximum actuator reflected inertia in a range of between about 0.05 to about 2 kg*m². The linear actuators that provide for particular upper body degrees of freedom shown in Table 1 can have a minimum actuator reflected inertia in a range of between about 0.02 to about 1.5 kg*m².

Figure 3:
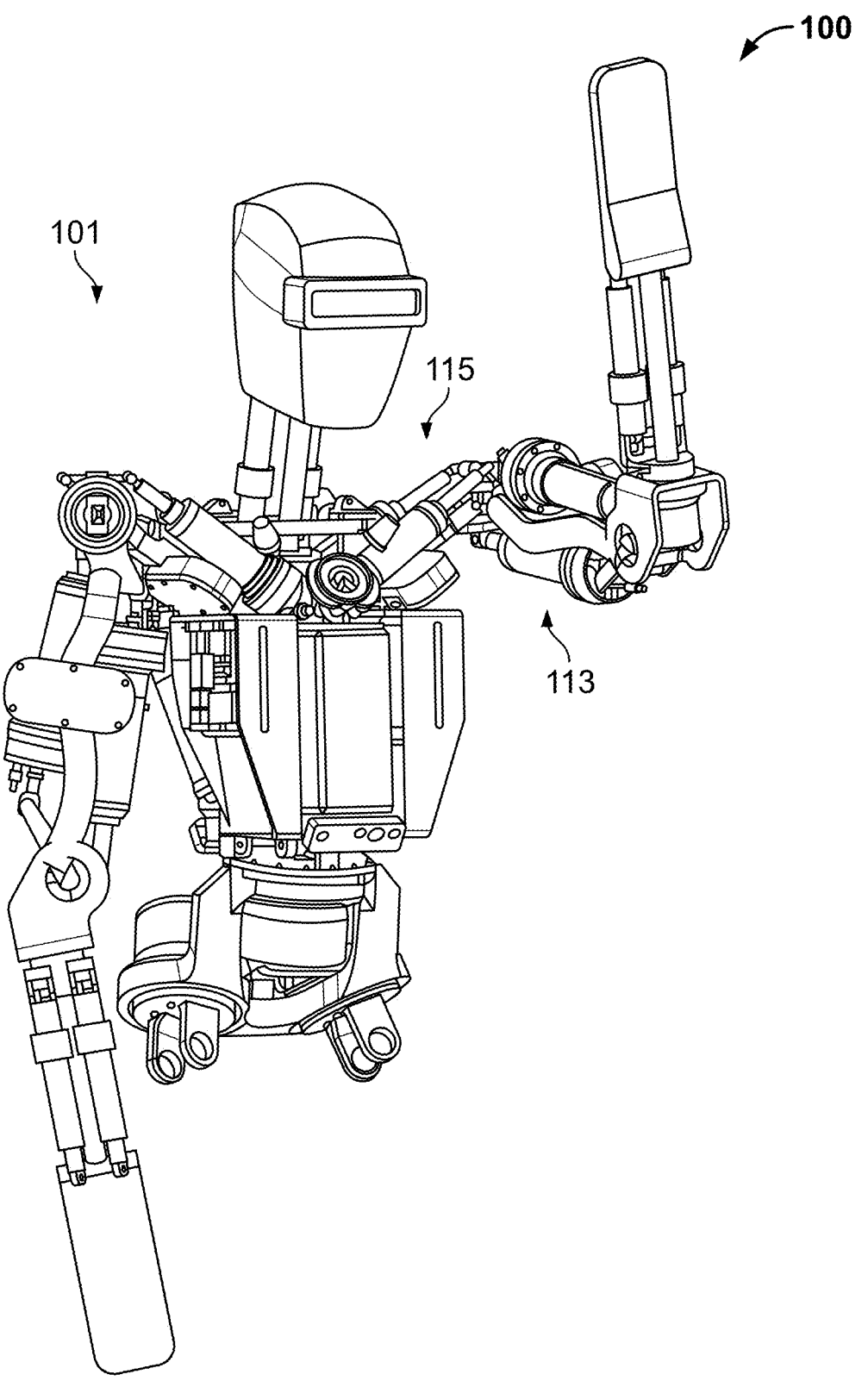
FIGS. 3 and 4 are schematic illustrations of sets of linear actuator pairs in an upper body assembly and lower body assembly, respectively, of an example implementation of a humanoid robot according to the present disclosure.
Figure 4:
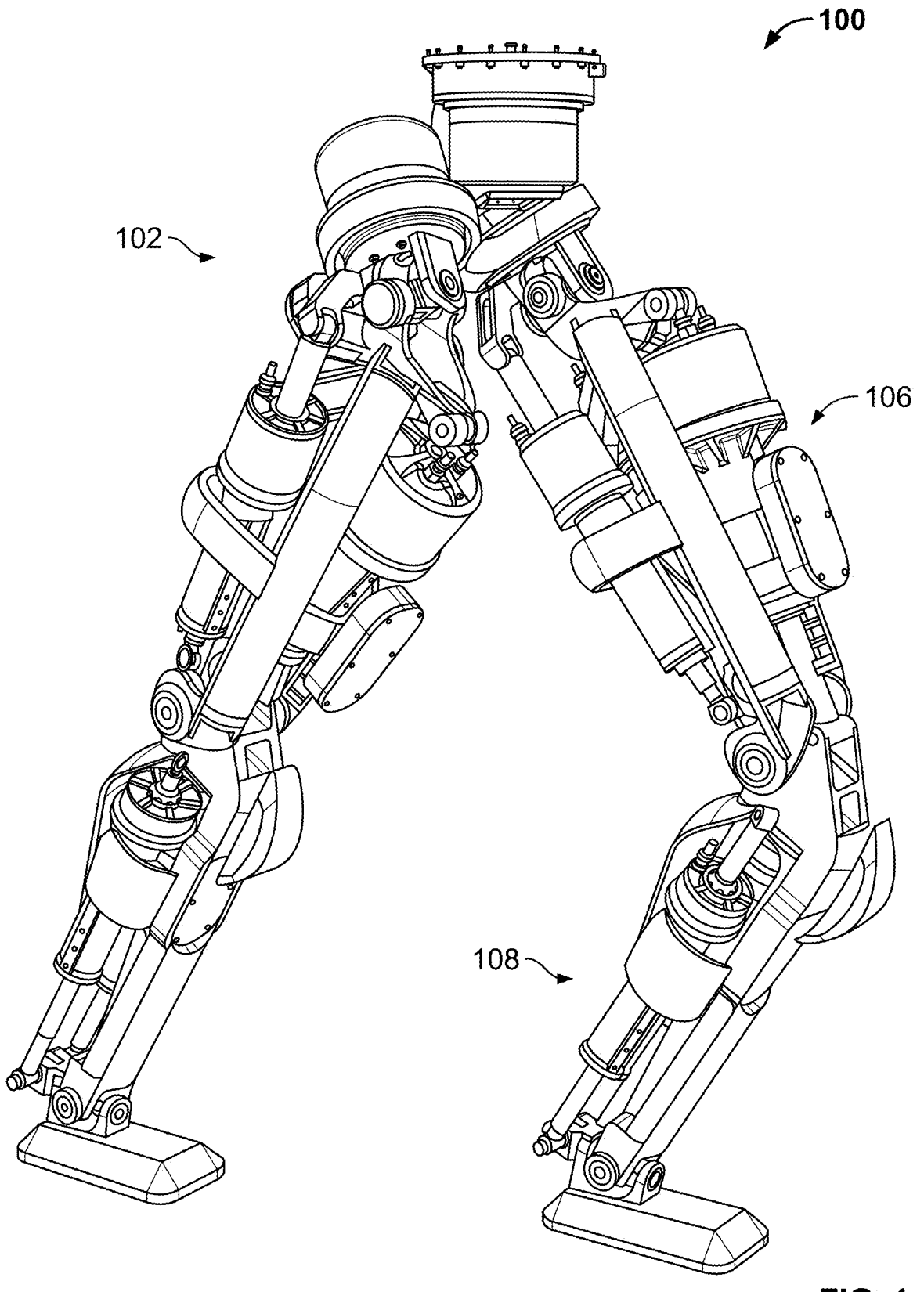

FIGS. 3 and 4 are schematic illustrations of sets of linear actuator pairs in the upper body assembly 101 and lower body assembly 102, respectively, of the example implementation of the humanoid robot 100 according to the present disclosure. For example, FIG. 3 shows the upper body assembly 101 in a position (e.g., wave) that implicates actuation of the pairs of linear actuators of the shoulder assembly 115 and a radial actuator of the elbow joint. FIG. 4 shows the lower body assembly 102 in a position (e.g., step) that implicates actuation of the pairs of linear actuators of the shoulder assembly 115 and a radial actuator of the elbow joint.

Figure 5:
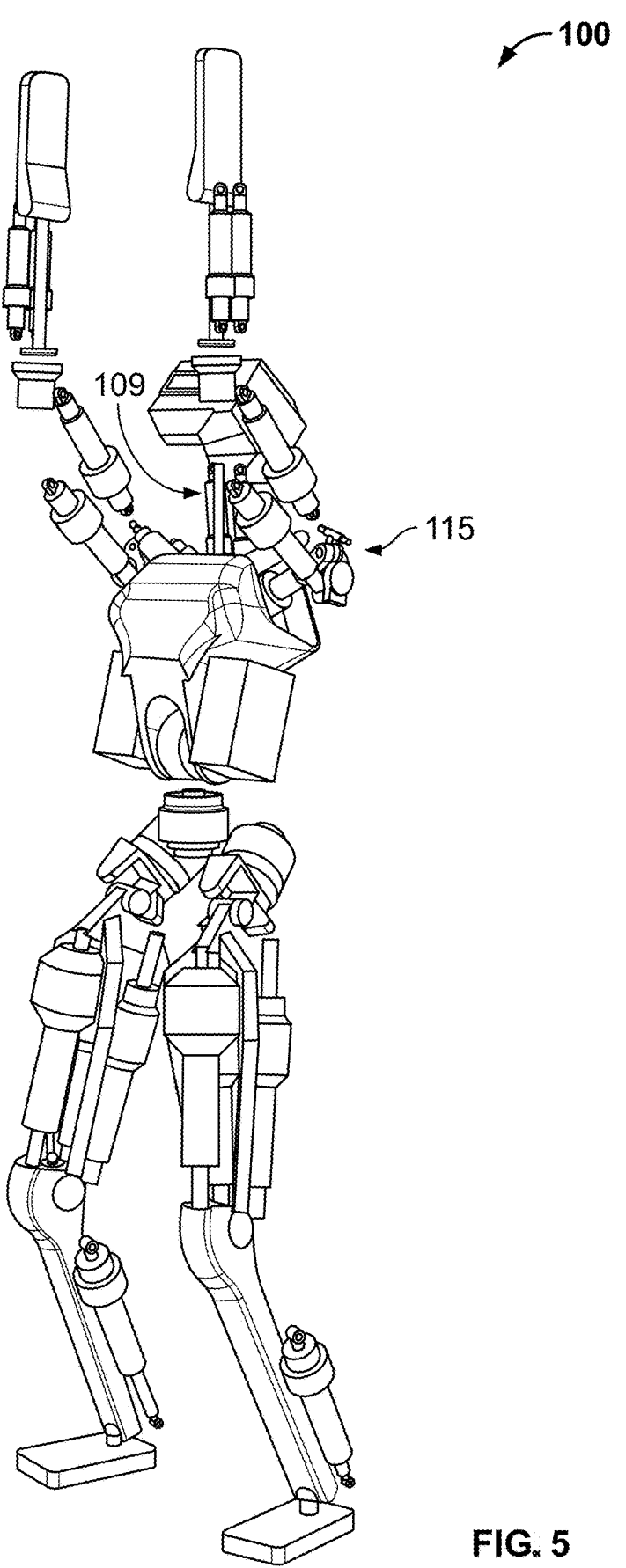
FIGS. 5 and 6 are schematic illustrations of an example implementation of a humanoid robot in different positions that show differential linear actuation of sets of linear actuator pairs according to the present disclosure.
Figure 6:
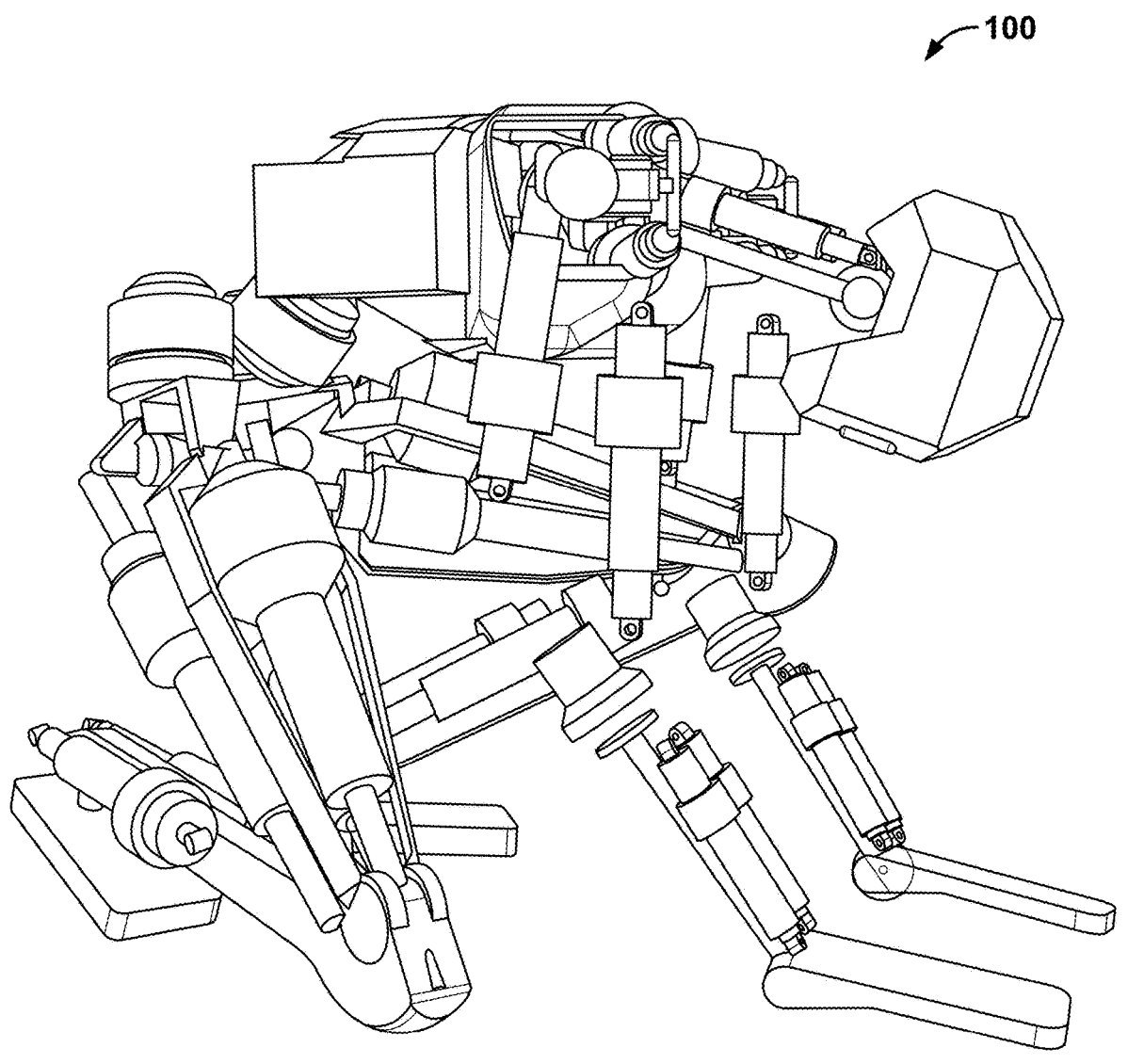

FIGS. 5 and 6 are schematic illustrations of the example implementation of the humanoid robot in different positions that show differential linear actuation of sets of linear actuator pairs according to the present disclosure. For example, FIG. 5 shows the humanoid robot 100 in a position (e.g., overhead reach) that implicates actuation of the pairs of linear actuators of the shoulder assembly 115, the pair of linear actuators of the neck assembly 109, and possibly the pairs of linear actuators 202 of the upper arm assemblies 113. FIG. 6 shows the humanoid robot 100 in a position (e.g., kneeling) that implicates actuation of the pairs of linear actuators 210 of the lower leg assembly 108, the pair of linear actuators 1102 of the torso assembly 105, the pairs of linear actuators 202 of the upper arm assemblies 113, the pairs of linear actuators 206 (and thigh linear actuators 208) of the upper leg assemblies 106, and potentially various radial actuators.

Figure 7:
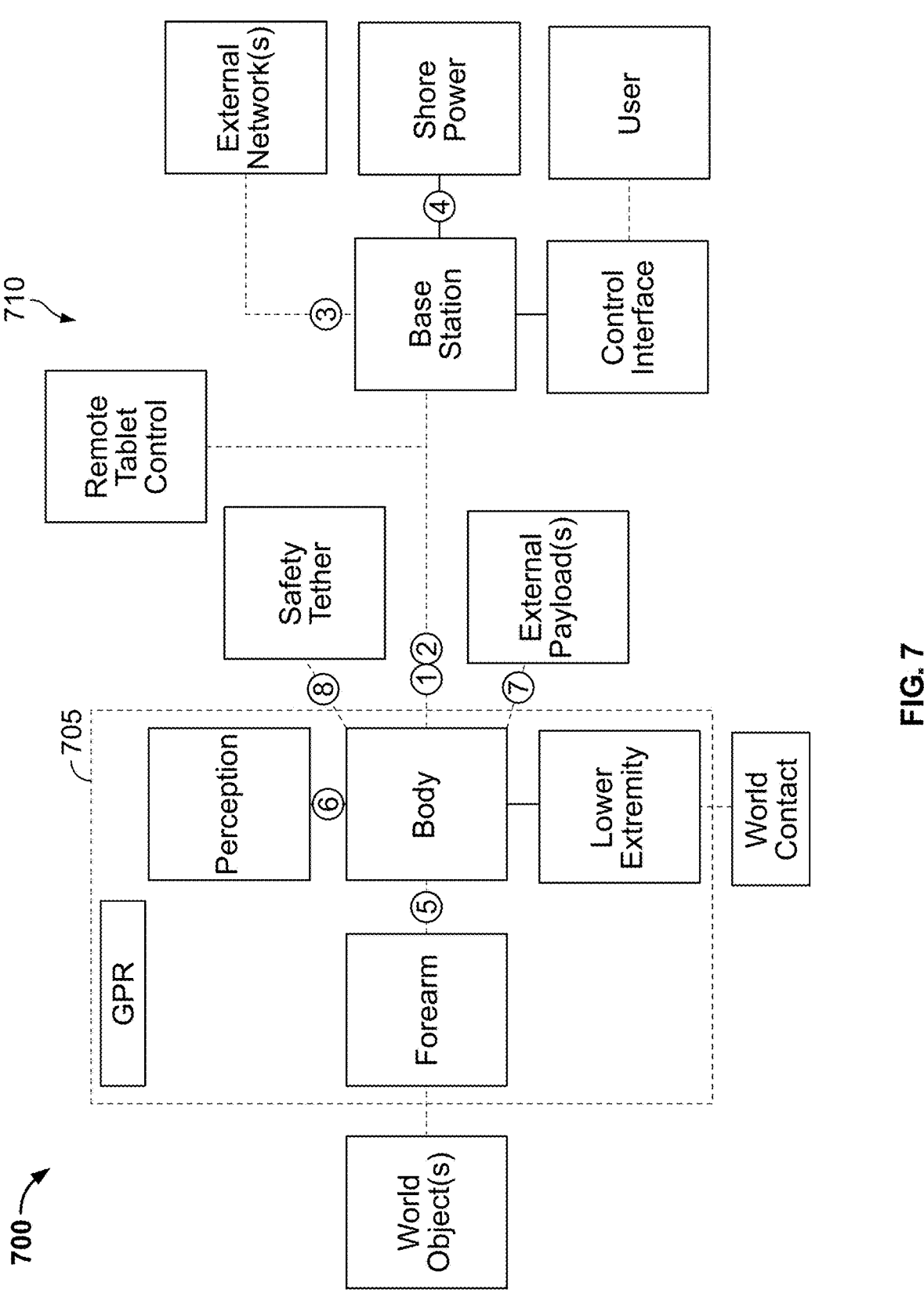
FIG. 7 is a box diagram of a network architecture that includes a humanoid robot architecture according to the present disclosure.

FIG. 7 is a box diagram of a network architecture 700 that includes a humanoid robot architecture 705 (e.g., for humanoid robot 100) according to the present disclosure. In this example architecture 700, the humanoid robot architecture 705 is shown in the shaded area and includes architecture components related to the torso ("body"), lower body assembly ("lower extremity"), upper body assembly ("forearm"), and control components ("perception") and how such components interact with a support surface ("world contact") and environmental objects ("world object(s)"). As further shown, the network architecture 700 includes an external control architecture 710. Components of the external control architecture 710 include control components, such as a remote tablet control, a control interface for a user. Components of the external control architecture 710 also include power components, such as a base station (e.g., to recharge batteries) and shore power (to provide, in some aspects, connected power during usage of the humanoid robot 100).

Figure 8A:
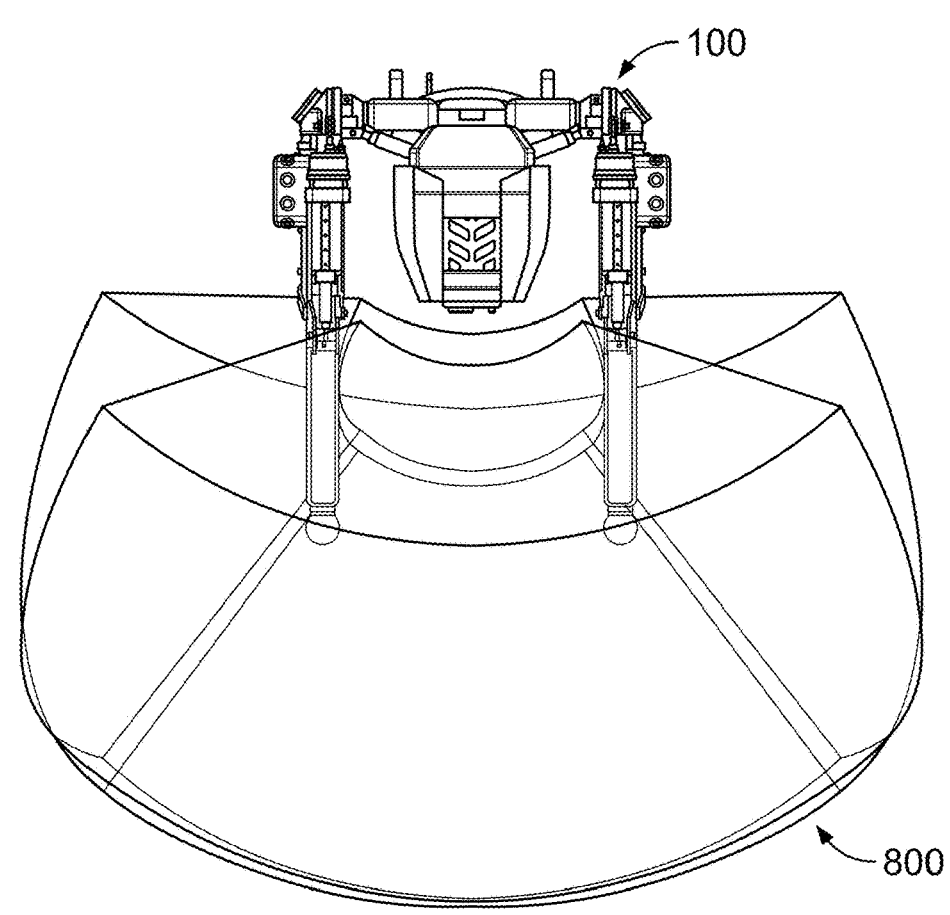
FIGS. 8A and 8B are schematic illustrations of front and side field of views, respectively, of an example implementation of a humanoid robot according to the present disclosure.
Figure 8B:
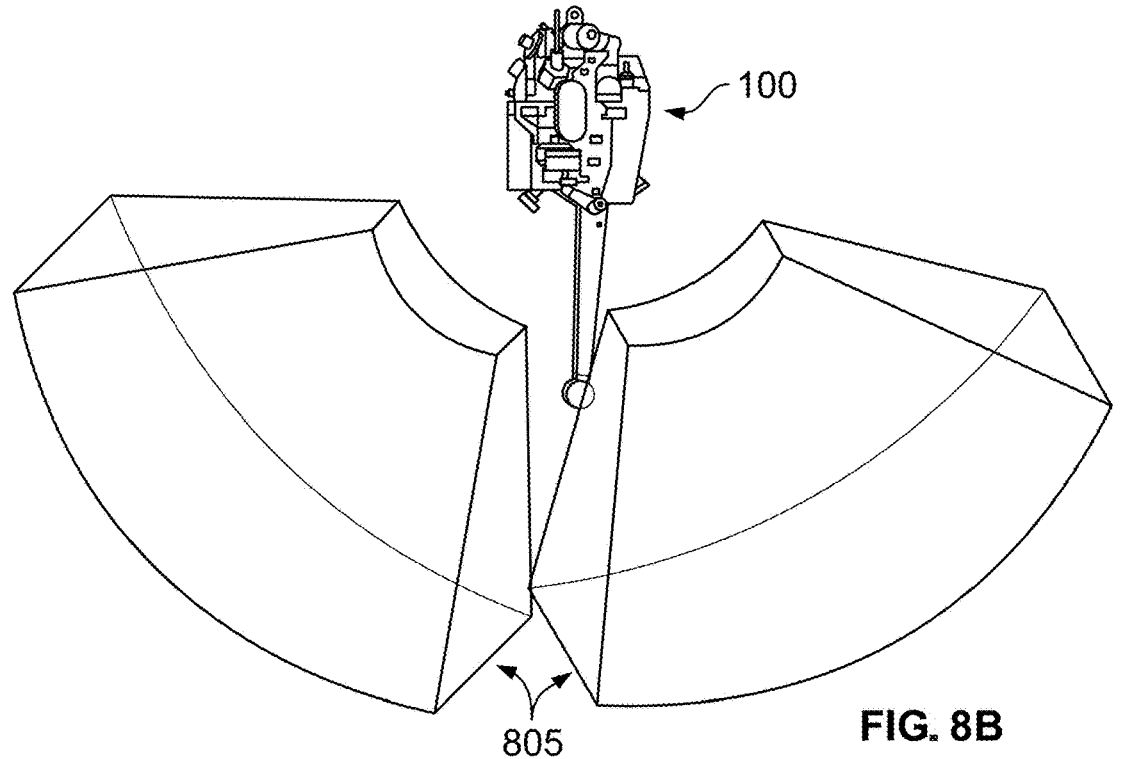

FIGS. 8A and 8B are schematic illustrations of front and side field of views, respectively, of the example implementation of the humanoid robot 100 according to the present disclosure. For example, FIG. 8A shows a front field of view 800 available to the humanoid robot 100 (such as, available to image sensors or other object detection or perception sensors). The front field of view 800, in some aspects, can be about 180° in front of the humanoid robot 100. FIG. 8B shows side fields of view 805 available to the humanoid robot 100 (such as, available to image sensors or other object detection or perception sensors). The side fields of view 805, in some aspects, can be about 90° each (side front and side back) to each side of the humanoid robot 100.

Figure 9A:
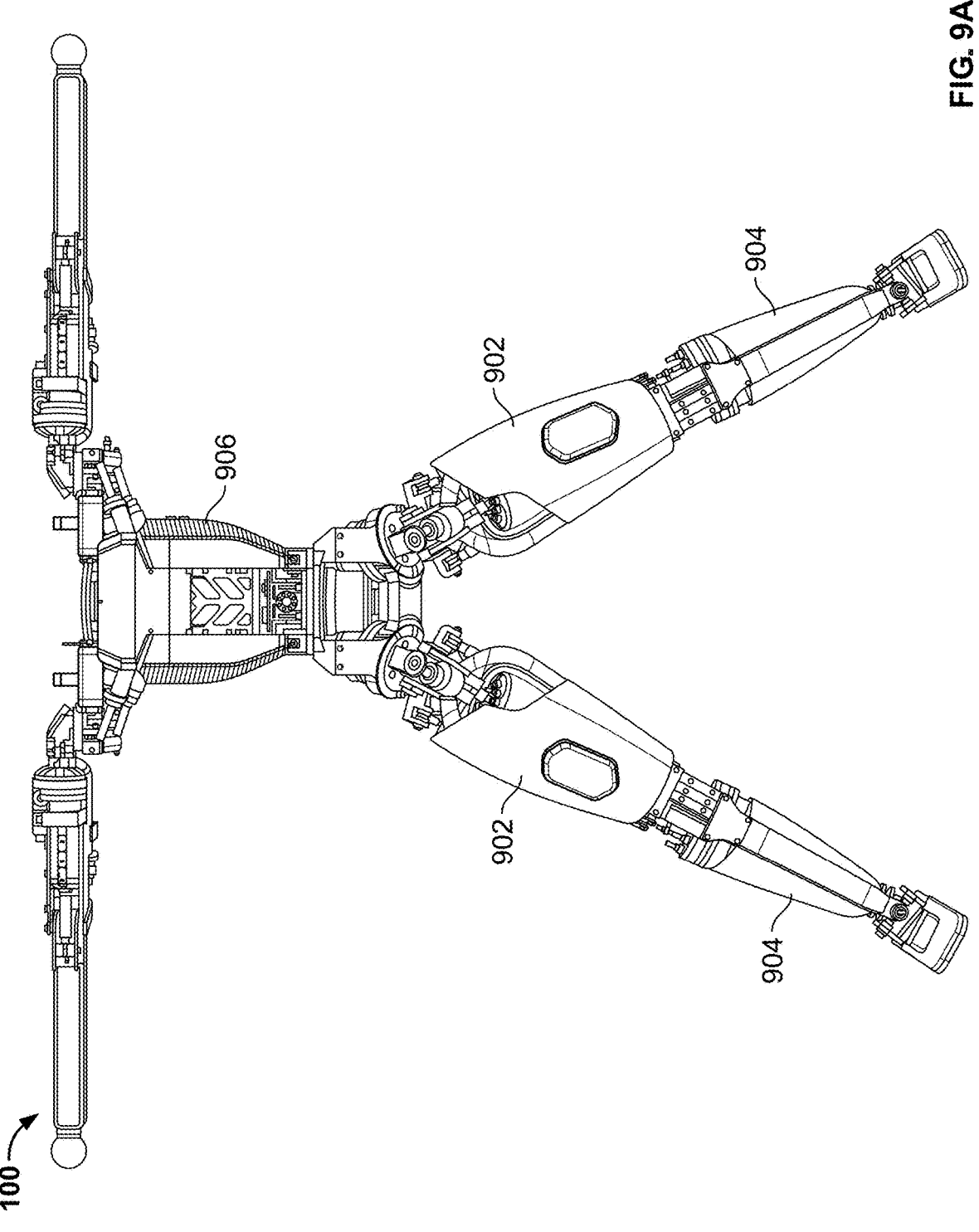
FIGS. 9A-9H are schematic illustrations of an example humanoid robot including aesthetic panels in different positions according to the present disclosure.
Figure 9B:
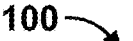
Figure 9C:
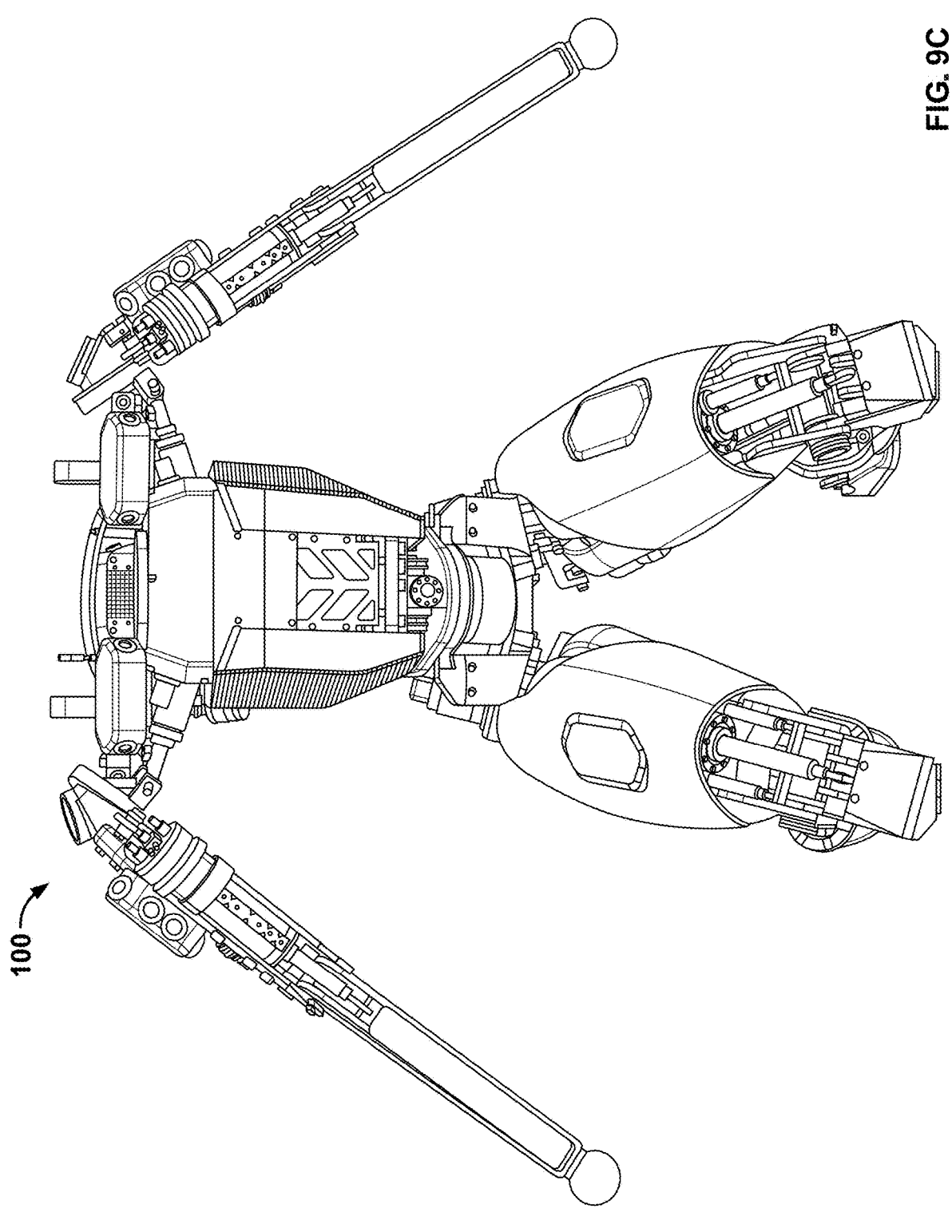
Figure 9D:
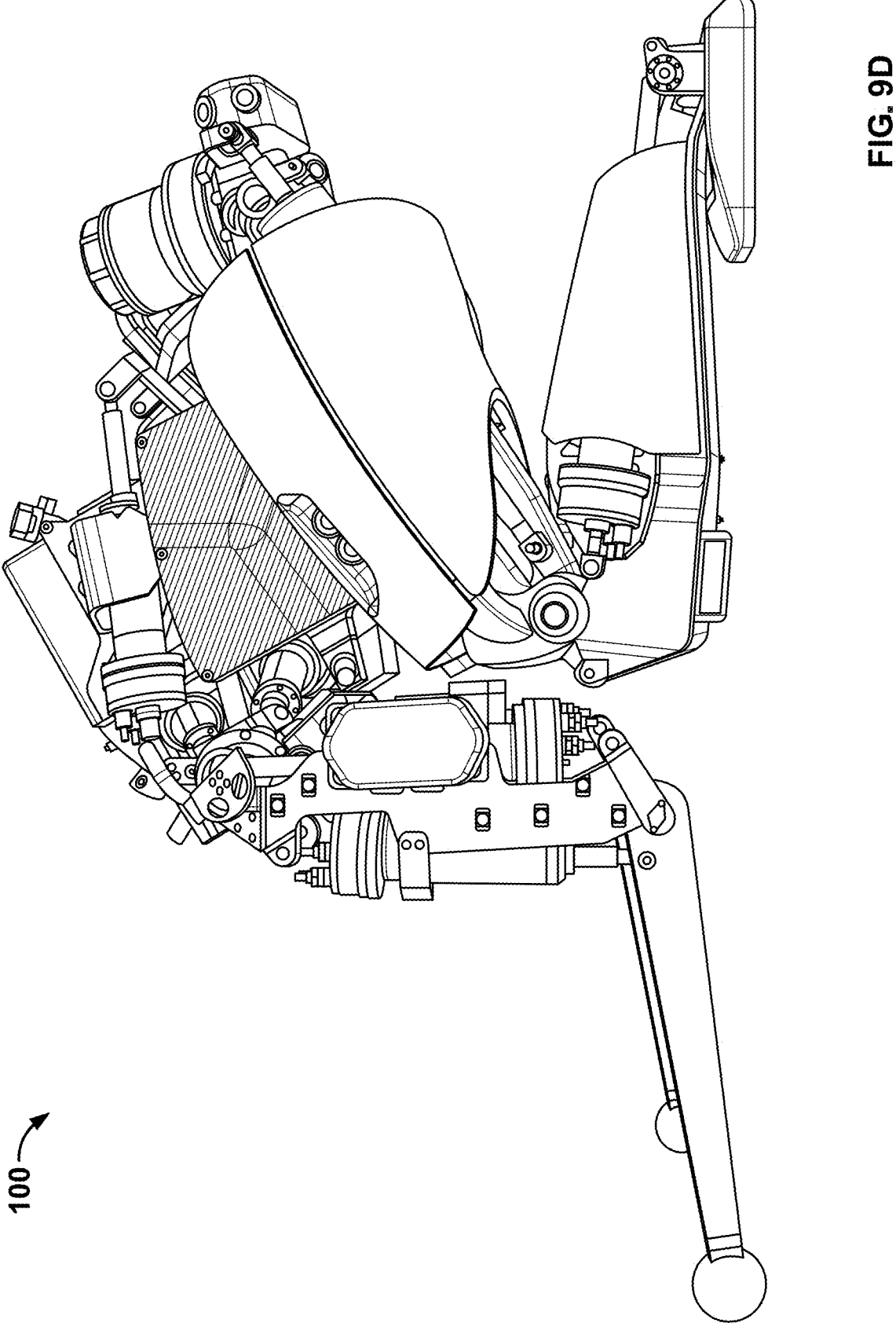
Figure 9E:
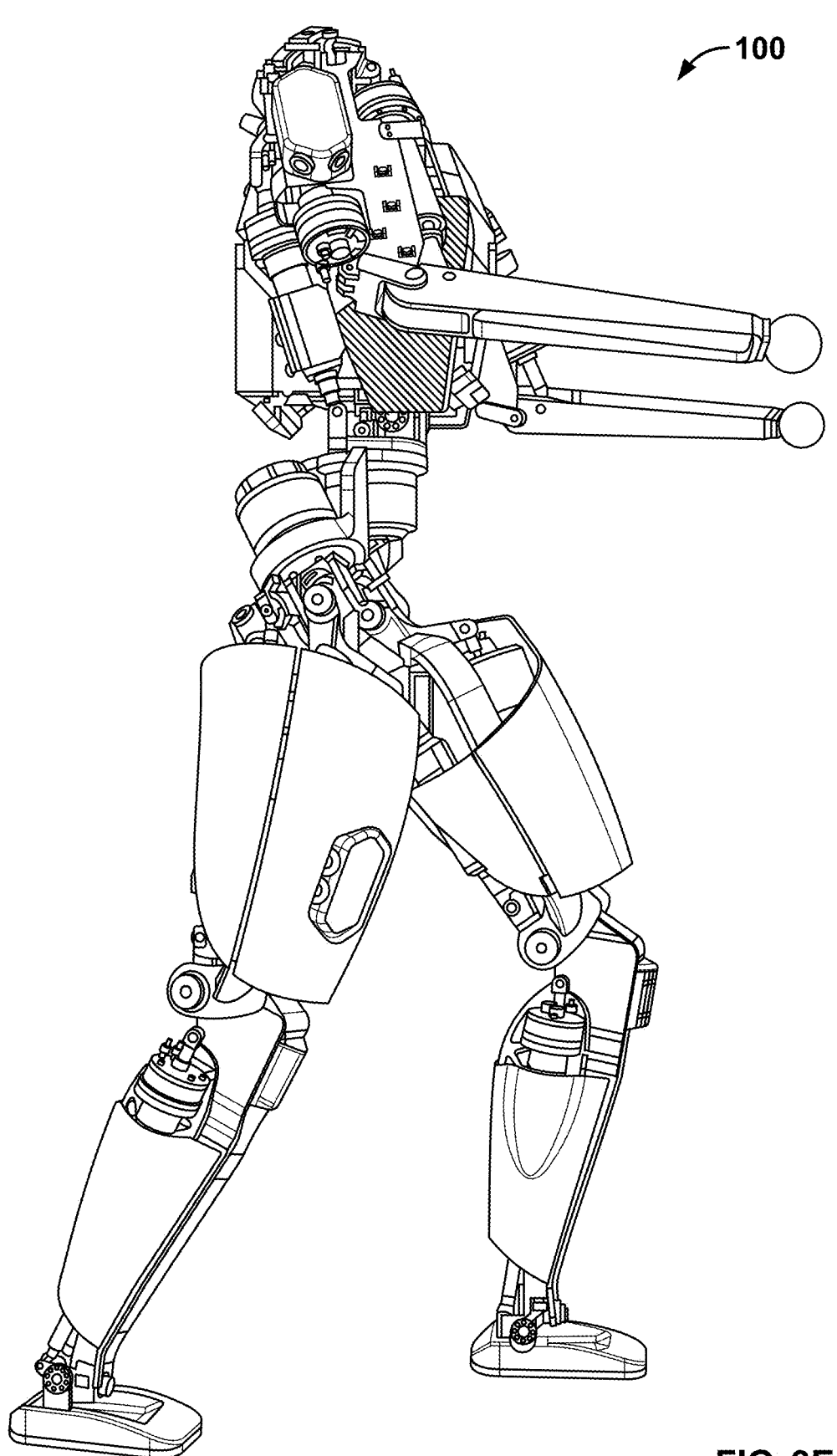
Figure 9F:
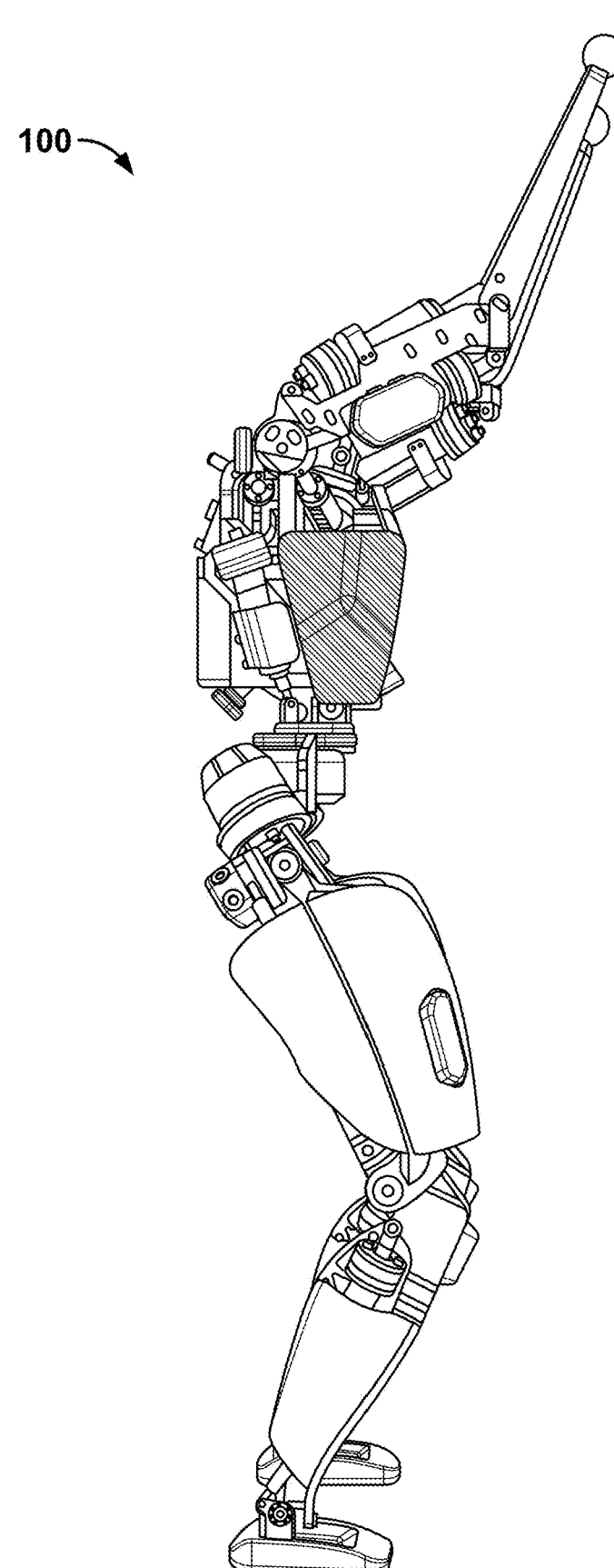
Figure 9G:
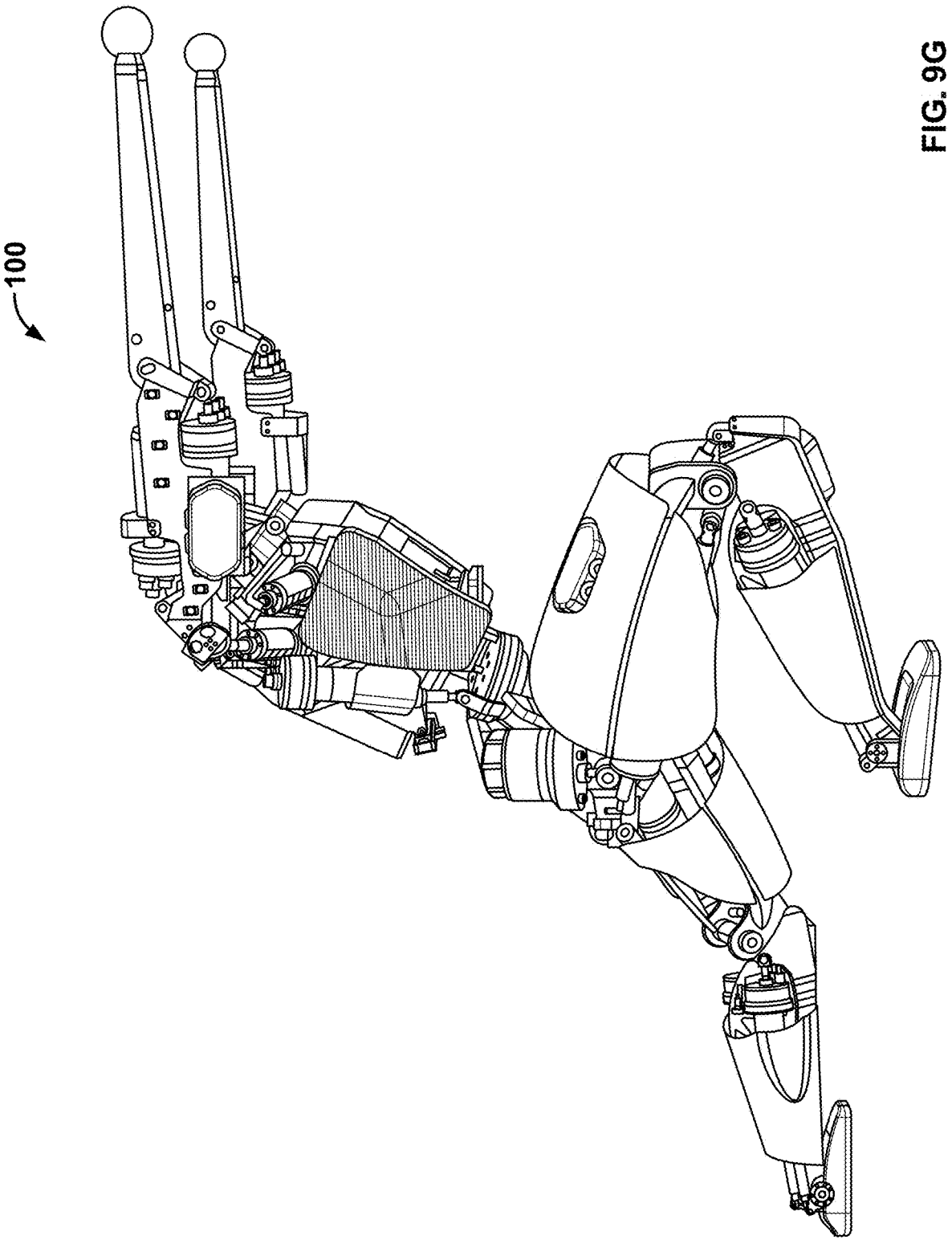
Figure 9H:
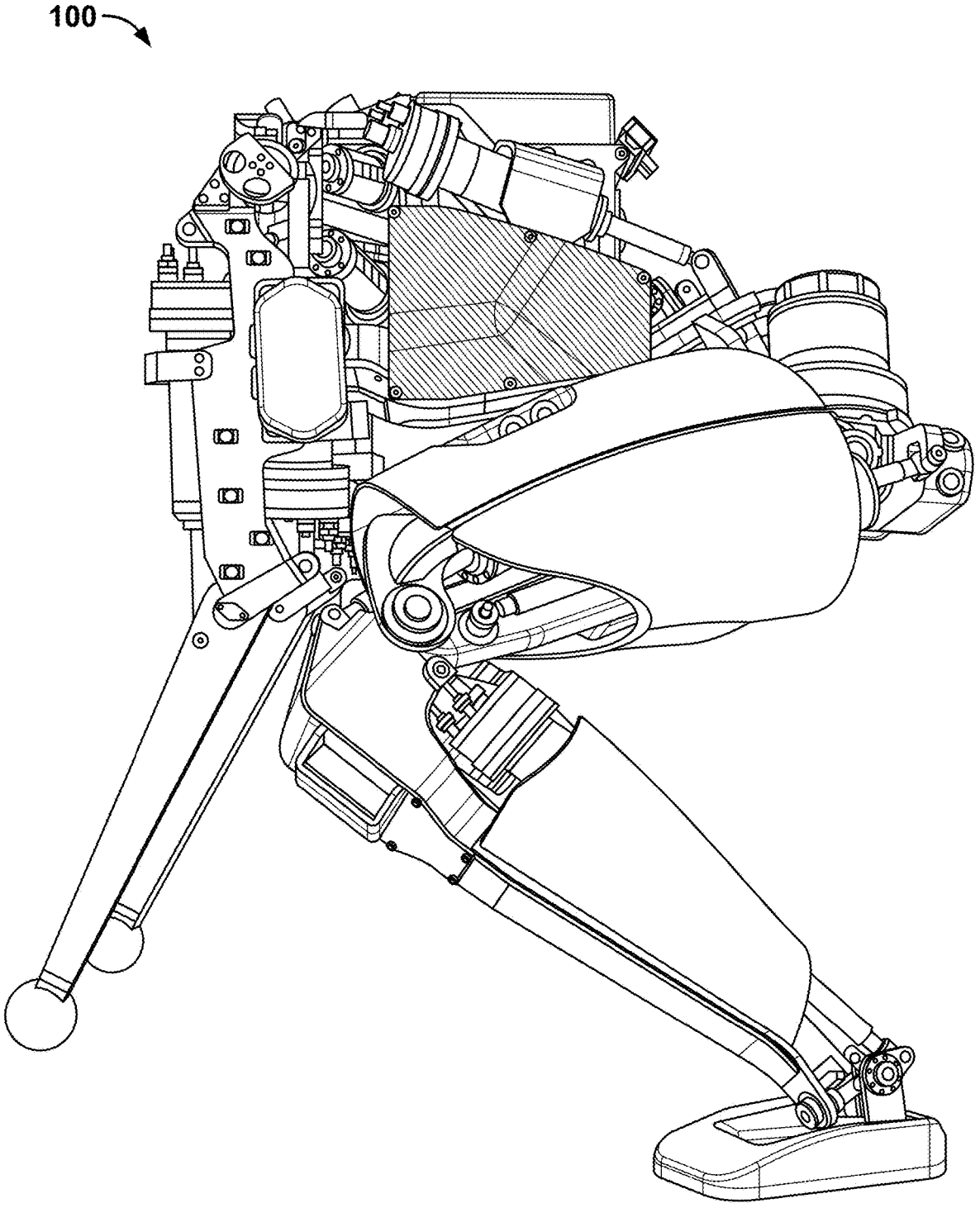

FIGS. 9A-9H are schematic illustrations of the example humanoid robot including aesthetic panels in different positions according to the present disclosure. In some aspects, aesthetic panels can be installed on the humanoid robot 100 to act as a "skin" or otherwise a covering for a frame, the linear and radial actuators, wiring, and control components of the humanoid robot 100. Although not every aesthetic panel is labeled in these figures, FIG. 9A shows the humanoid robot 100 in a "Vitruvian man" position with torso panel 906, upper leg panels 902, and lower leg panels 904. The remaining FIGS. 9B-9H illustrate additional, unlabeled aesthetic panels, as well as additional positions of the humanoid robot 100. For example, FIG. 9B shows the humanoid robot 100 in a squat position. FIG. 9C shows the humanoid robot 100 in a kneel position. FIG. 9D shows the humanoid robot 100 in a "child's pose" position. FIG. 9E shows the humanoid robot 100 in a carrying position. FIG. 9F shows the humanoid robot 100 in an overhead reach position. FIG. 9G shows the humanoid robot 100 in a forward push/calf stretch position. FIG. 9H shows the humanoid robot 100 in a "crouching tiger" position.

Figure 10A:
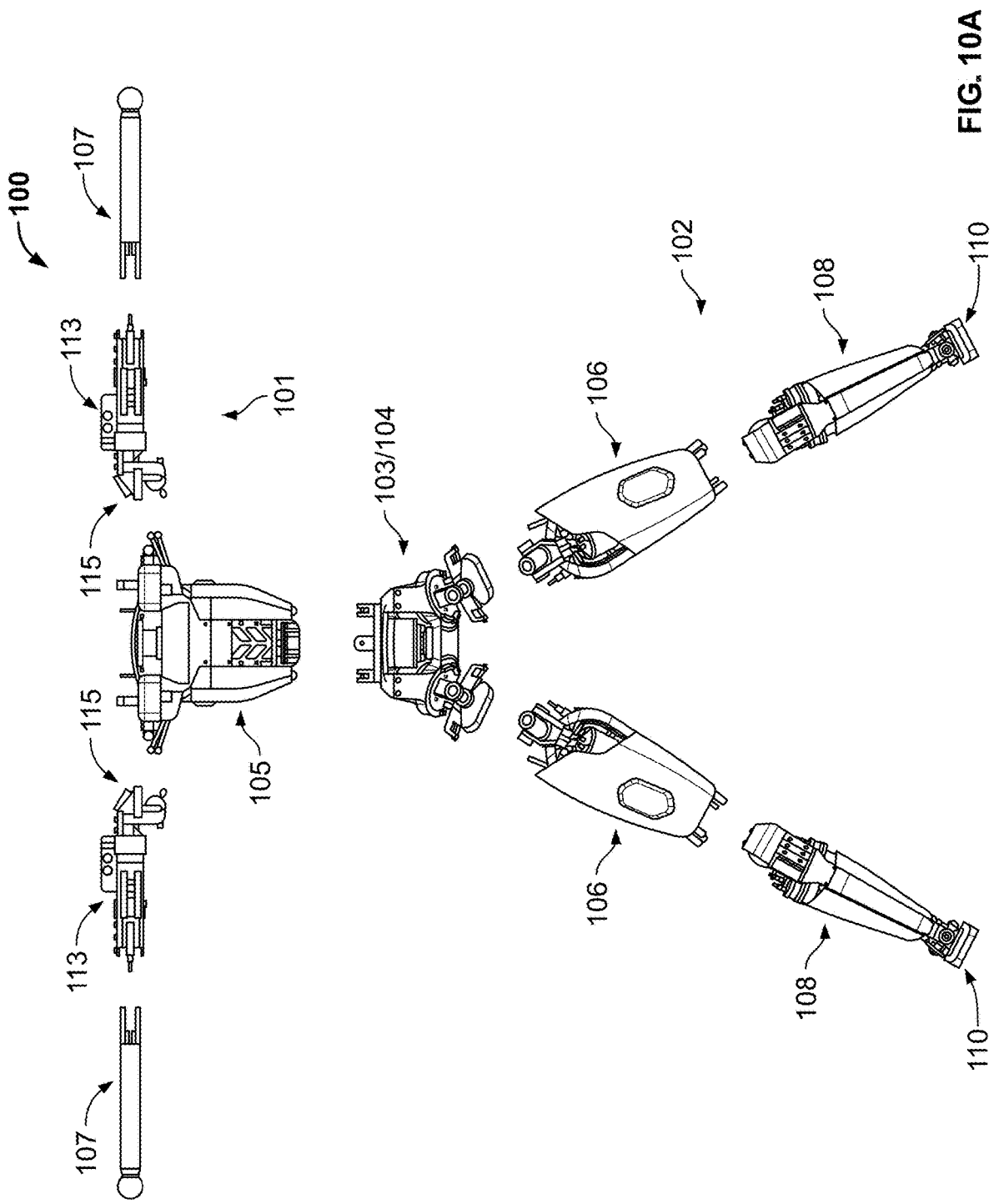
FIGS. 10A and 10B are exploded illustrations of front and back views, respectively, of an example implementation of a humanoid robot according to the present disclosure.
Figure 10B:
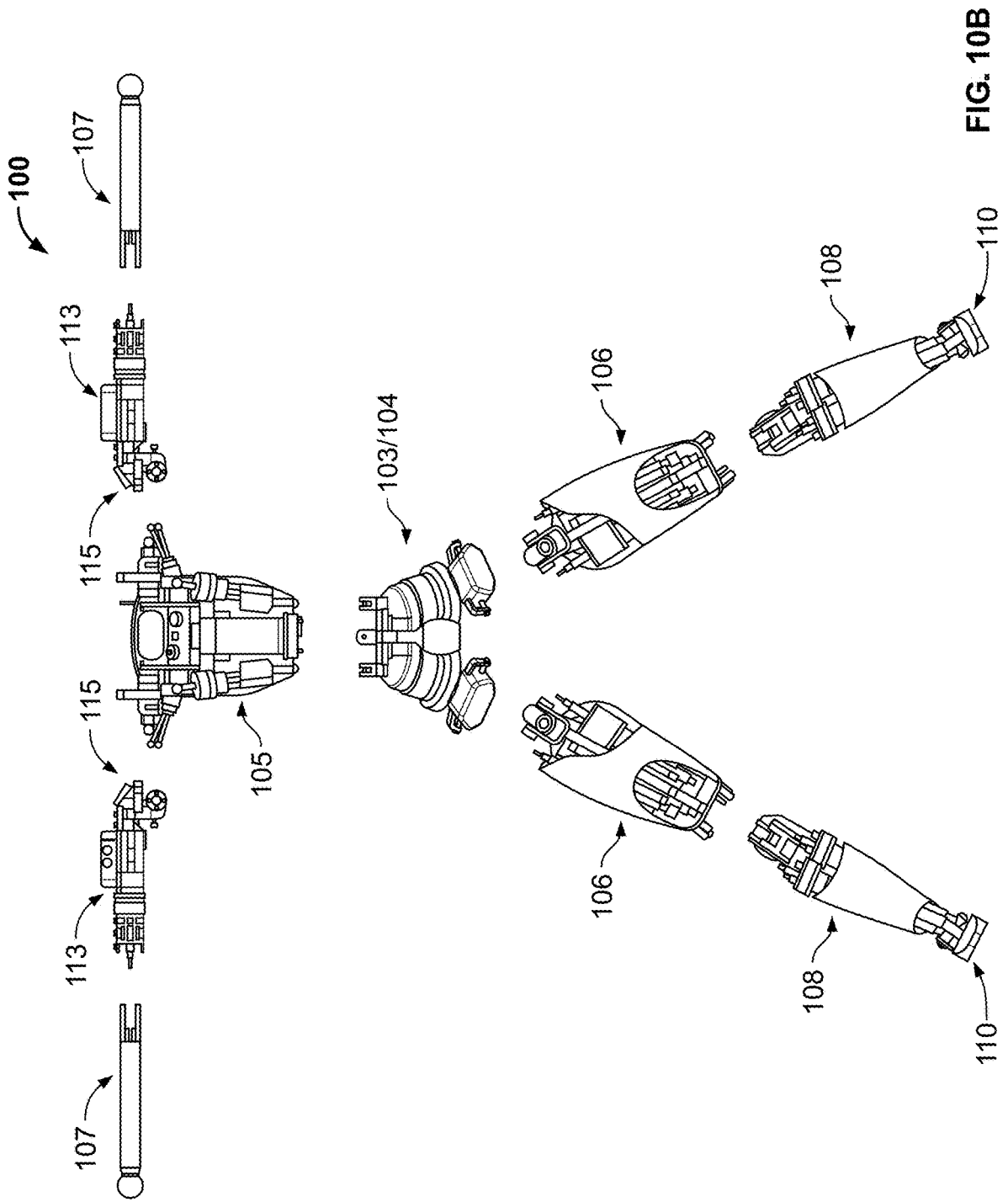

FIGS. 10A and 10B are exploded illustrations of front and back views, respectively, of the example implementation of the humanoid robot 100 according to the present disclosure. Each view shows the humanoid robot 100 in an exploded "Vitruvian man" pose, which shows: lower arm assemblies 107, upper arm assemblies 113 (and shoulder assemblies 115), torso assembly 105, the pelvic assembly 103 coupled to hip assembly 104, upper leg assemblies 106, lower leg assemblies 108, and foot assemblies 110. Aesthetic panels are shown covering each of the illustrated assemblies.

Figure 11B:
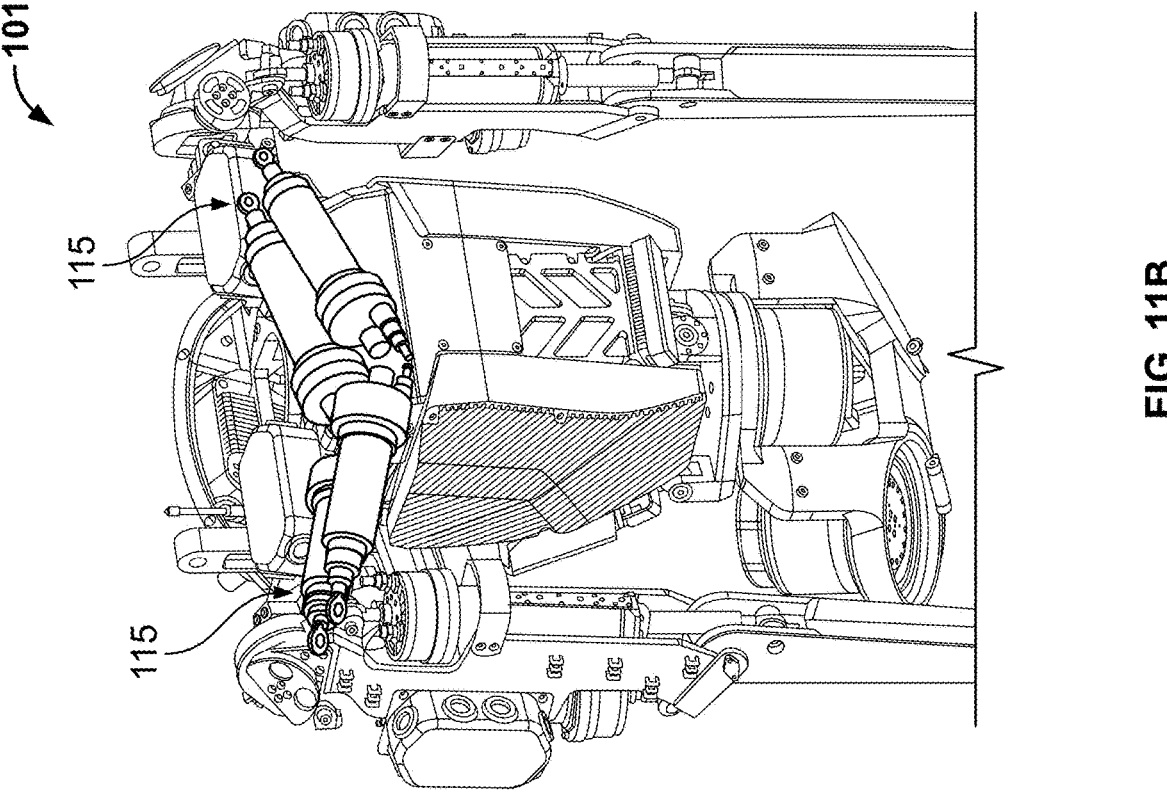

FIGS. 11A-11H are schematic illustrations of an upper body assembly of an example humanoid robot 100 including linear actuators and other control components according to the present disclosure. For example, FIG. 11A shows torso assembly with a pair of linear actuators 1102. FIG. 11B shows the upper body assembly 101 with pairs of linear actuators for the shoulder assemblies 115.

Figure 11C:
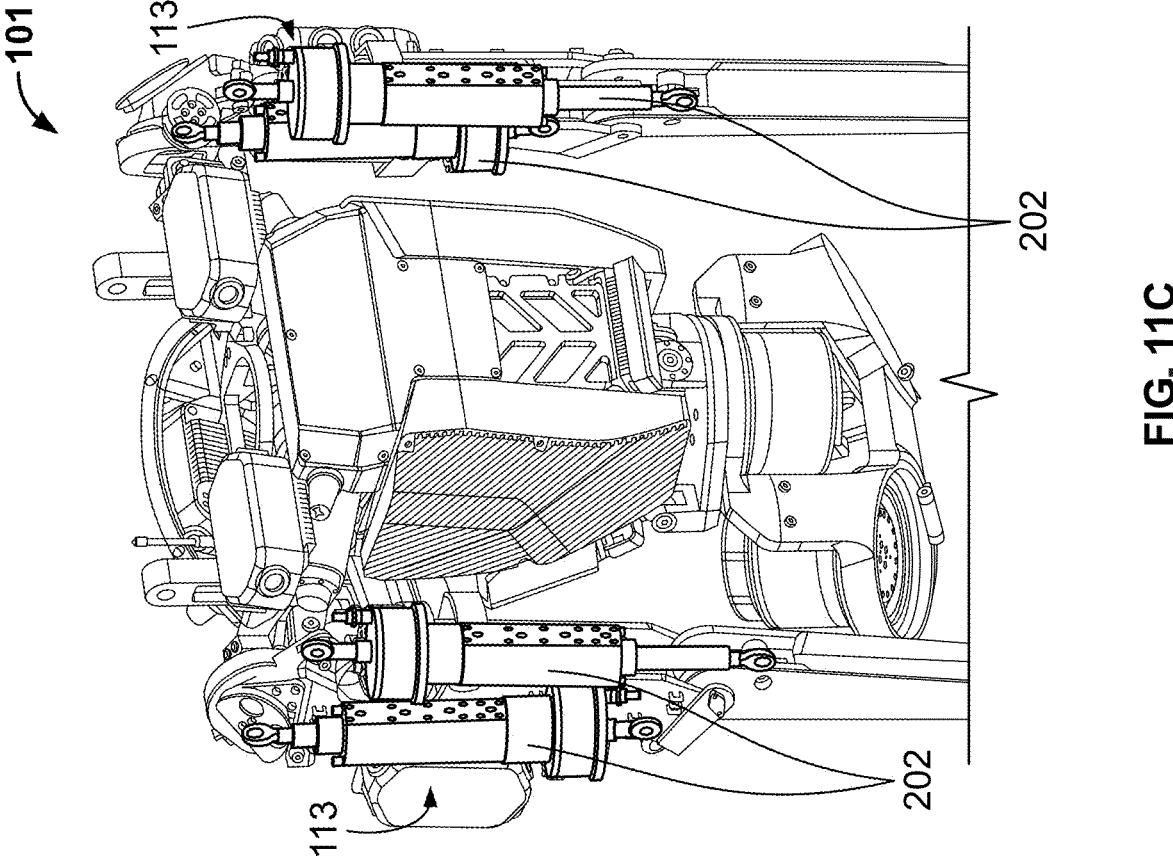
Figure 11D:
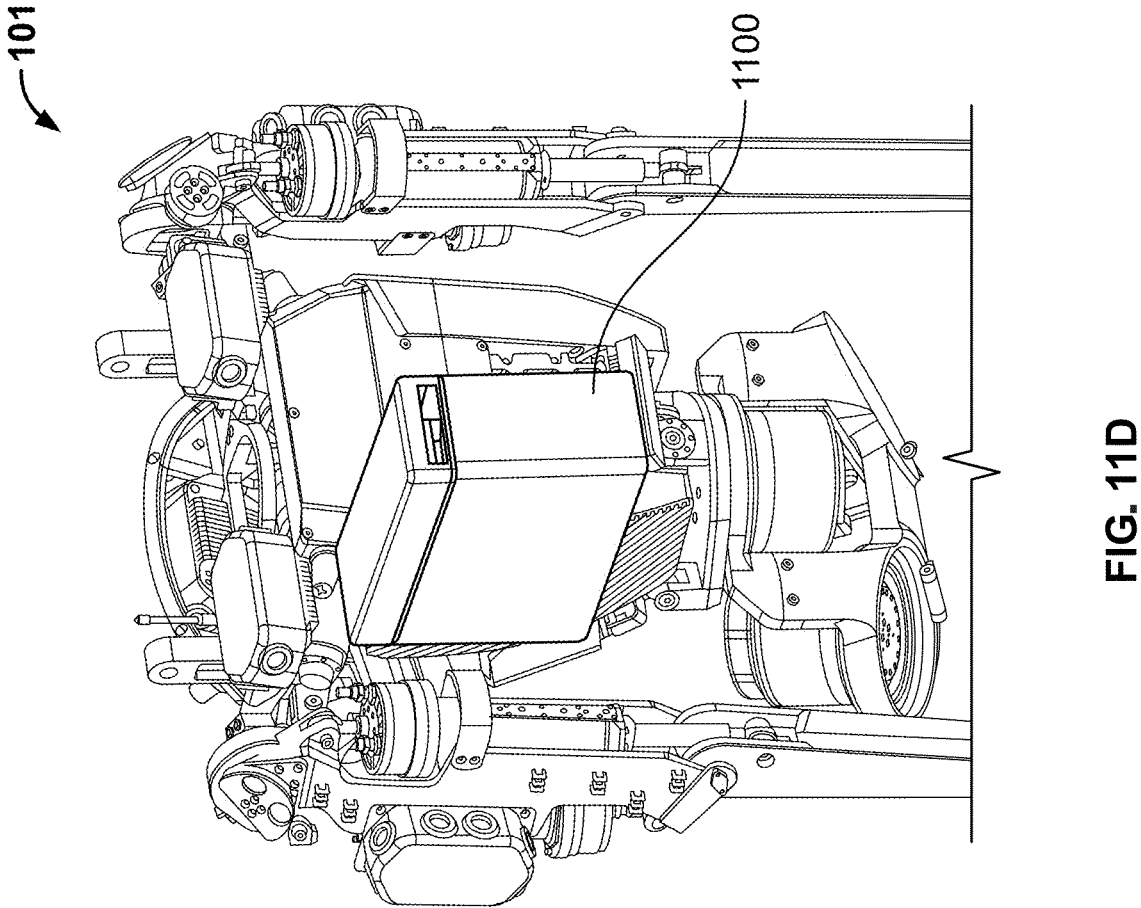

FIG. 11C shows the upper arm assemblies 113 with pairs of linear actuators 202. FIG. 11D illustrates the upper body assembly 101 and a power management system 1100. In some aspects, the power management system 1100 includes one or more power sources (e.g., batteries) and a power control circuit to control the usage of power provided to, e.g., motor controllers that control linear and radial actuators, from the power sources.

Figure 11E:
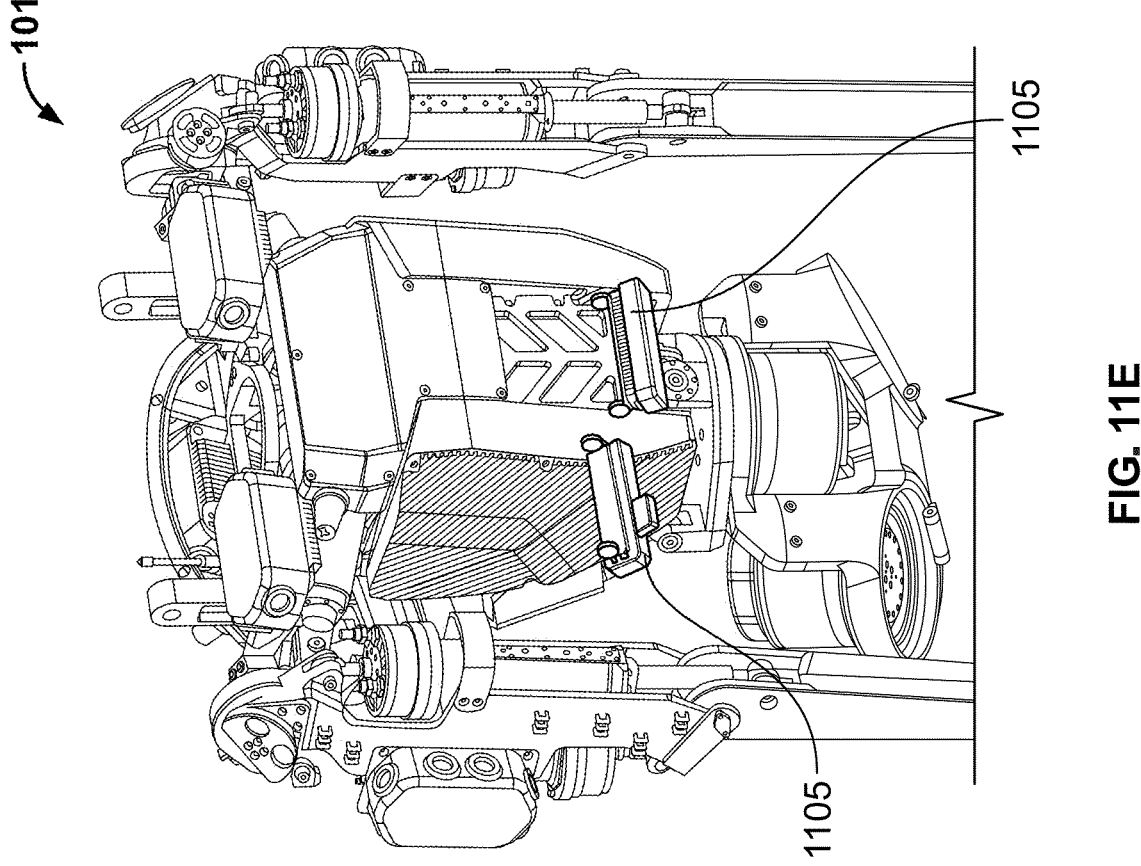

FIG. 11E shows the upper body assembly 101 and one or more (in this case, two) perception cameras 1105. Perception cameras 1105 can provide visual images (still or moving) on which control of the humanoid robot 100 (e.g., through control of the described linear and radial actuators) can be based.

Figure 11F:
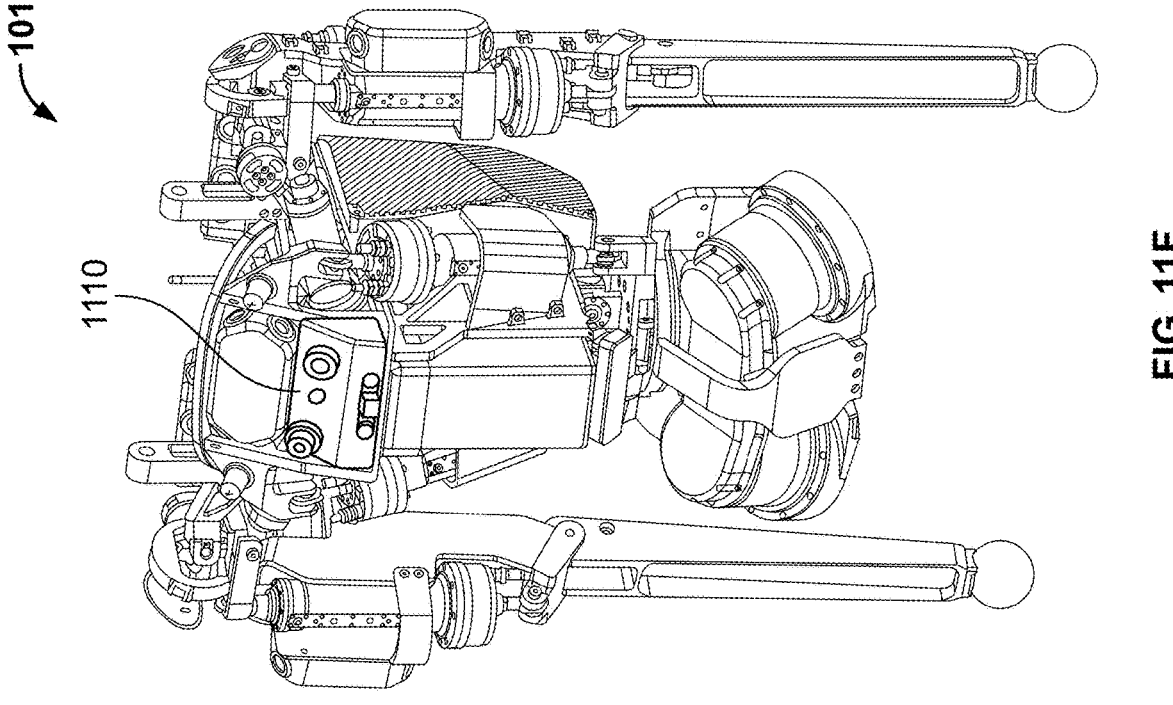

FIG. 11F shows upper body assembly 101 and user interface 1110. In some aspects, user interface 1110 can include power indicators and a power button, network or other communication channels (e.g., an RJ45 connection), and a shore power connection to which a power conduit can attach to provide electrical power (e.g., to charge batteries or otherwise provide power to motor controllers and other control components).

Figure 11G:
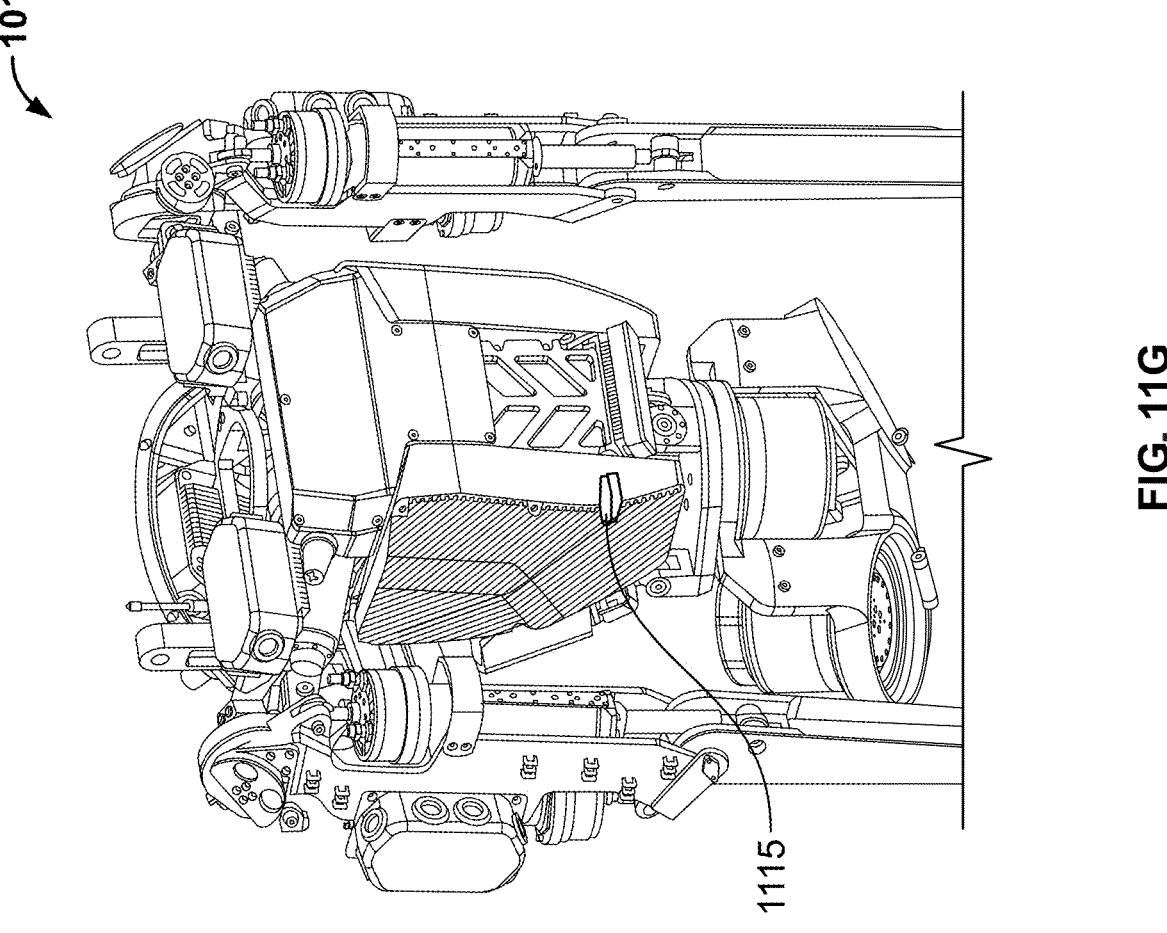

FIG. 11G shows upper body assembly 101 and an inertial measurement unit (IMU) 1115. In some aspects, IMU 1115, in combination with other components, can provide for movement control of the humanoid robot 100 (e.g., to prevent the humanoid robot 100 from falling over, either while standing or while walking) or control the humanoid robot 100 to manipulate objects in the environment. For example, the IMU 1115 can include sensors (accelerometers or other balance or perception sensors) and algorithms for mapping the world and identifying objects of interest for manipulation by the humanoid robot 100. In some aspects, the IMU 1115 is part of or otherwise communicably coupled to a "brain," or on-board controller, of the humanoid robot 100 that includes one or more hardware processors and memory modules (e.g., positioned on one or more PCBs and/or PLCs) as well as stored software instructions to implement control commands.

Figure 11H:
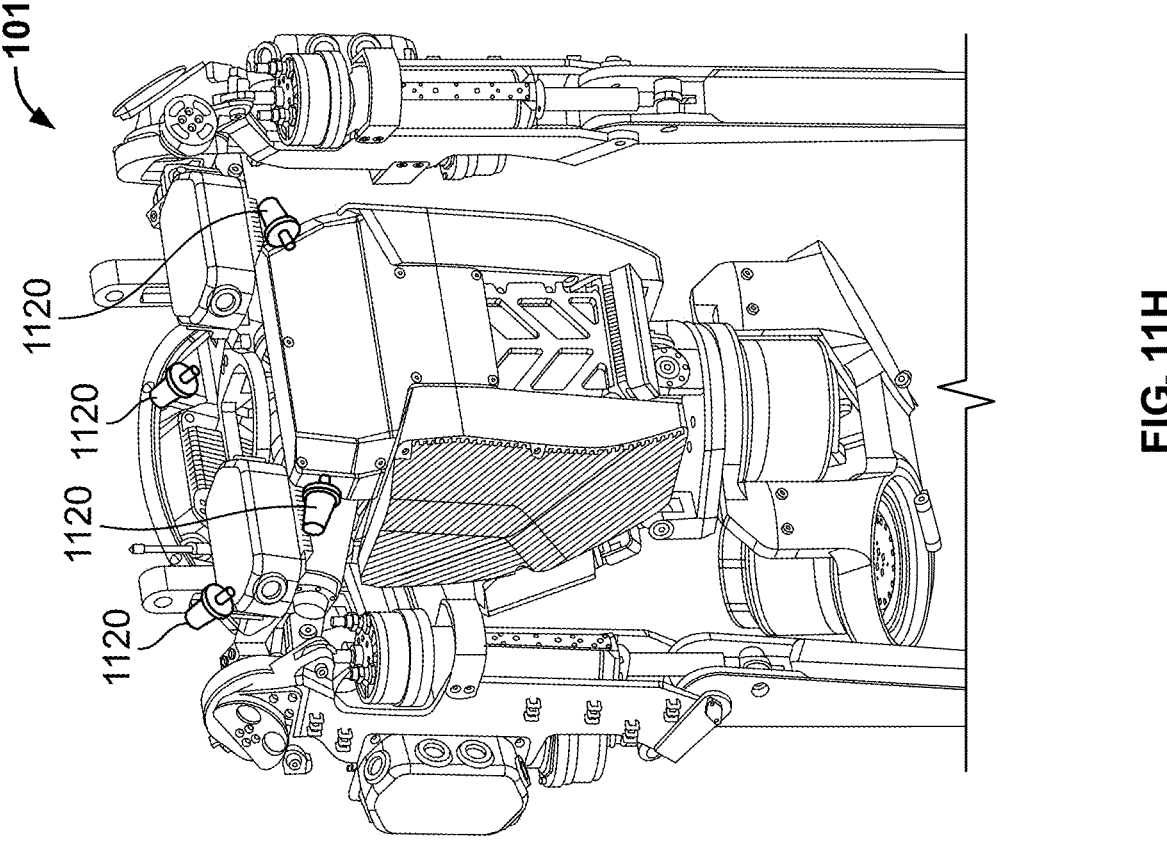

FIG. 11H shows the upper body assembly 101 and radio antennae 1120. In some aspects, the radio antennae 1120 can provide for wireless communication between the humanoid robot 100 and external control architecture 710 to control, activate, deactivate, or otherwise communicate with the humanoid robot 100.

FIGS. 12A-12E are schematic illustrations of portions of a frame assembly of the upper body assembly 101 of the example humanoid robot 100 according to the present disclosure. FIGS. 13A-13F are schematic illustrations of portions of a frame assembly of the lower body assembly 102 of the example humanoid robot 100 according to the present disclosure. These figures show portions (but not all) of an overall frame assembly that acts or otherwise mimics a "skeleton" of the humanoid robot 100. In some aspects, portions of an overall frame assembly of the humanoid robot 100 are coupled together with bearings, pivots, or otherwise joints that are relatively movable. The components of an overall frame assembly are also attached (directly or indirectly) to the illustrated linear actuators to provide grounded connections so that operation of the pairs of linear actuators by differential linear actuation move the components of the overall frame assembly. Aesthetic panels can also be attached to components of an overall frame assembly.

Figure 12A:
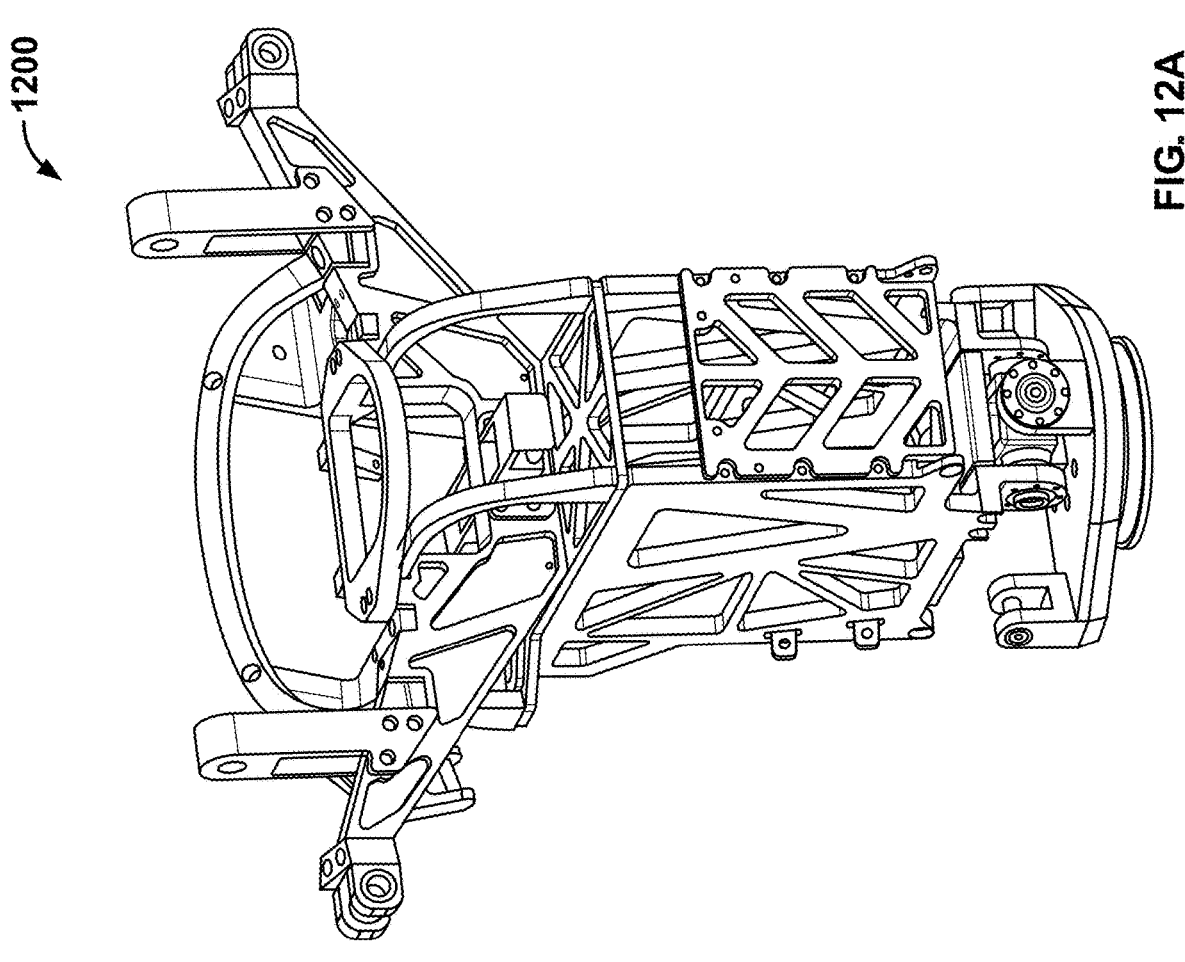
FIGS. 12A-12E are schematic illustrations of portions of a frame assembly of an upper body assembly of an example humanoid robot according to the present disclosure.
Figure 12B:
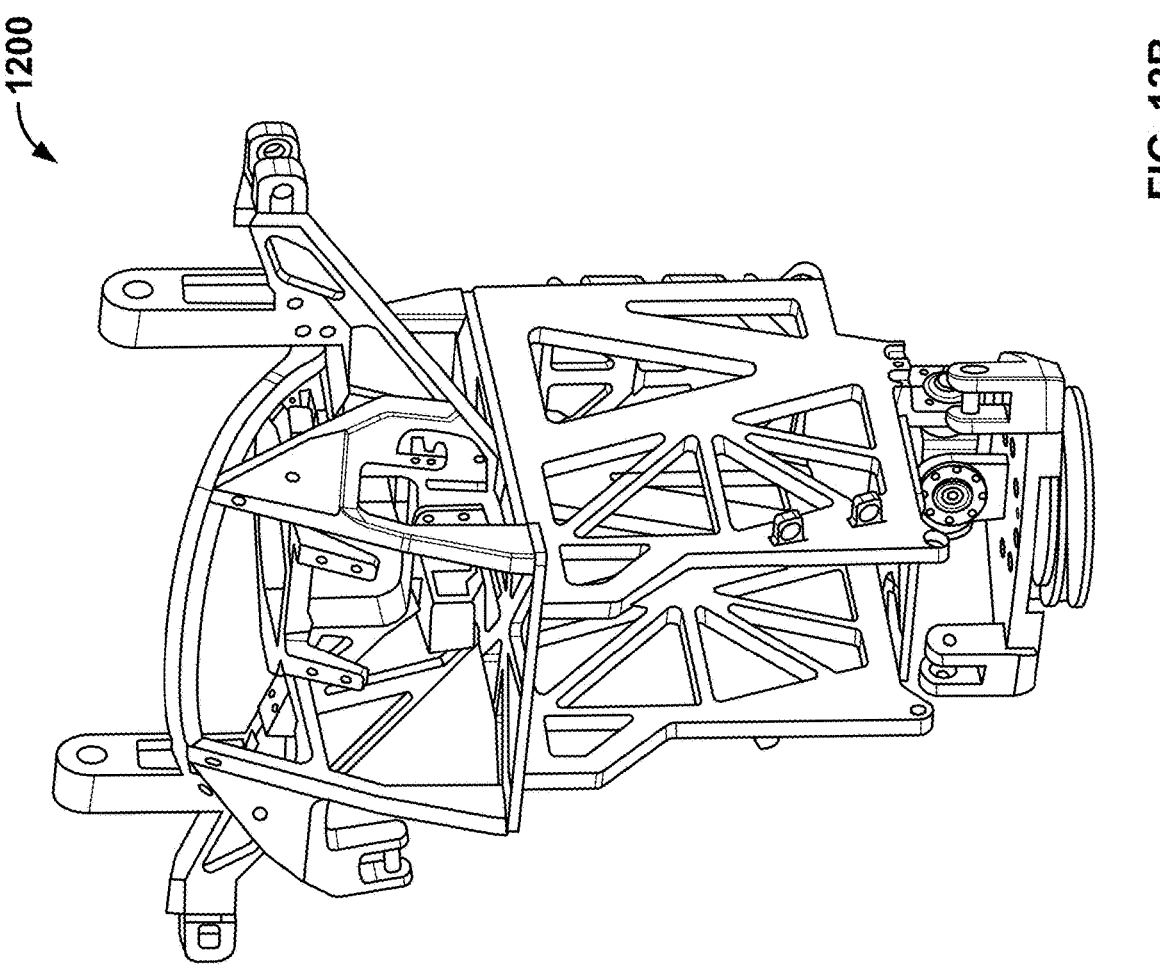
Figure 12D:
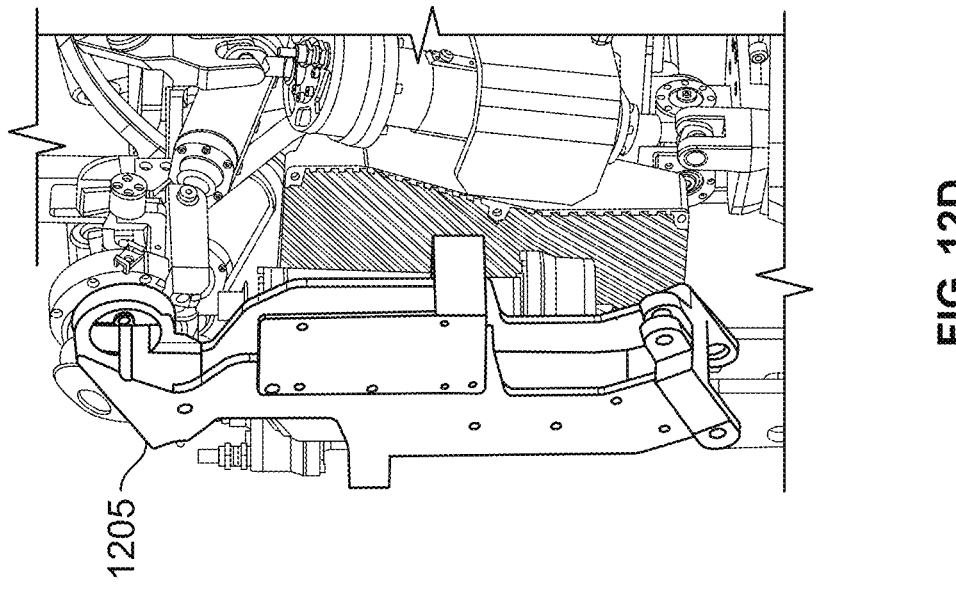
Figure 12C:
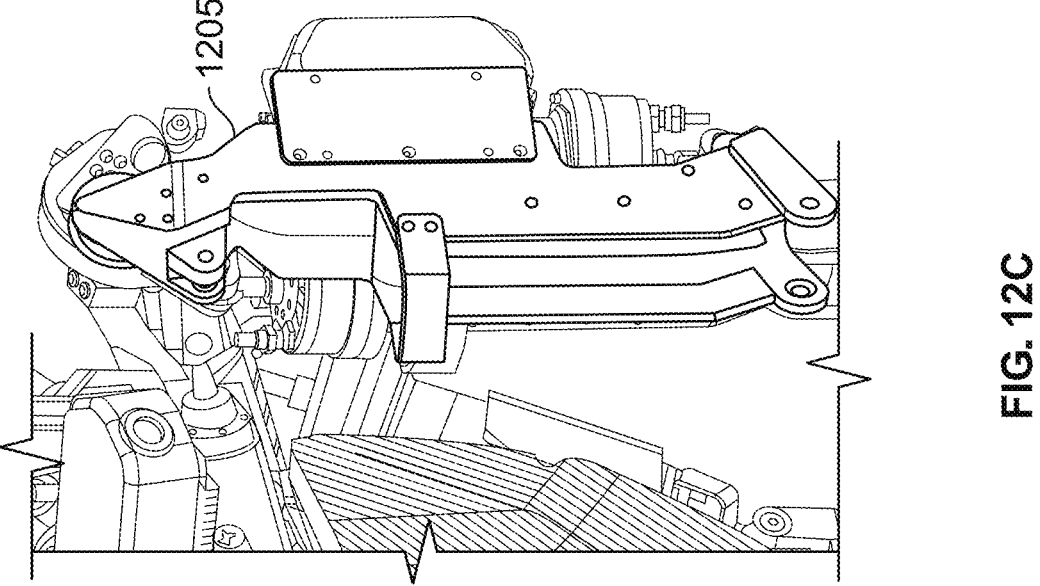
Figure 12E:
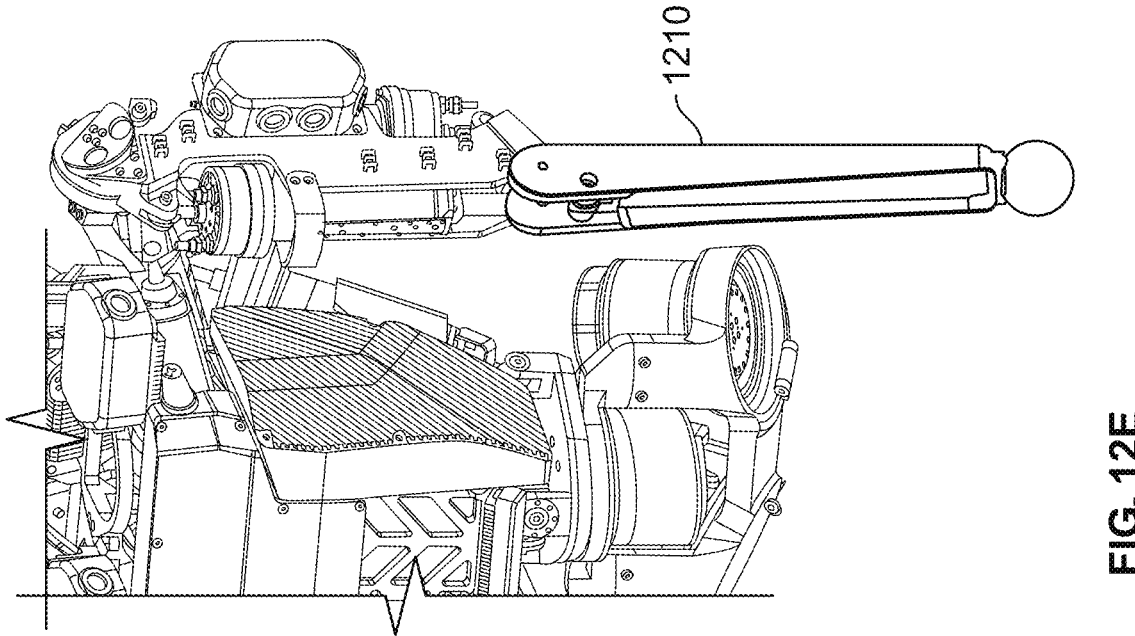
Figure 13A:
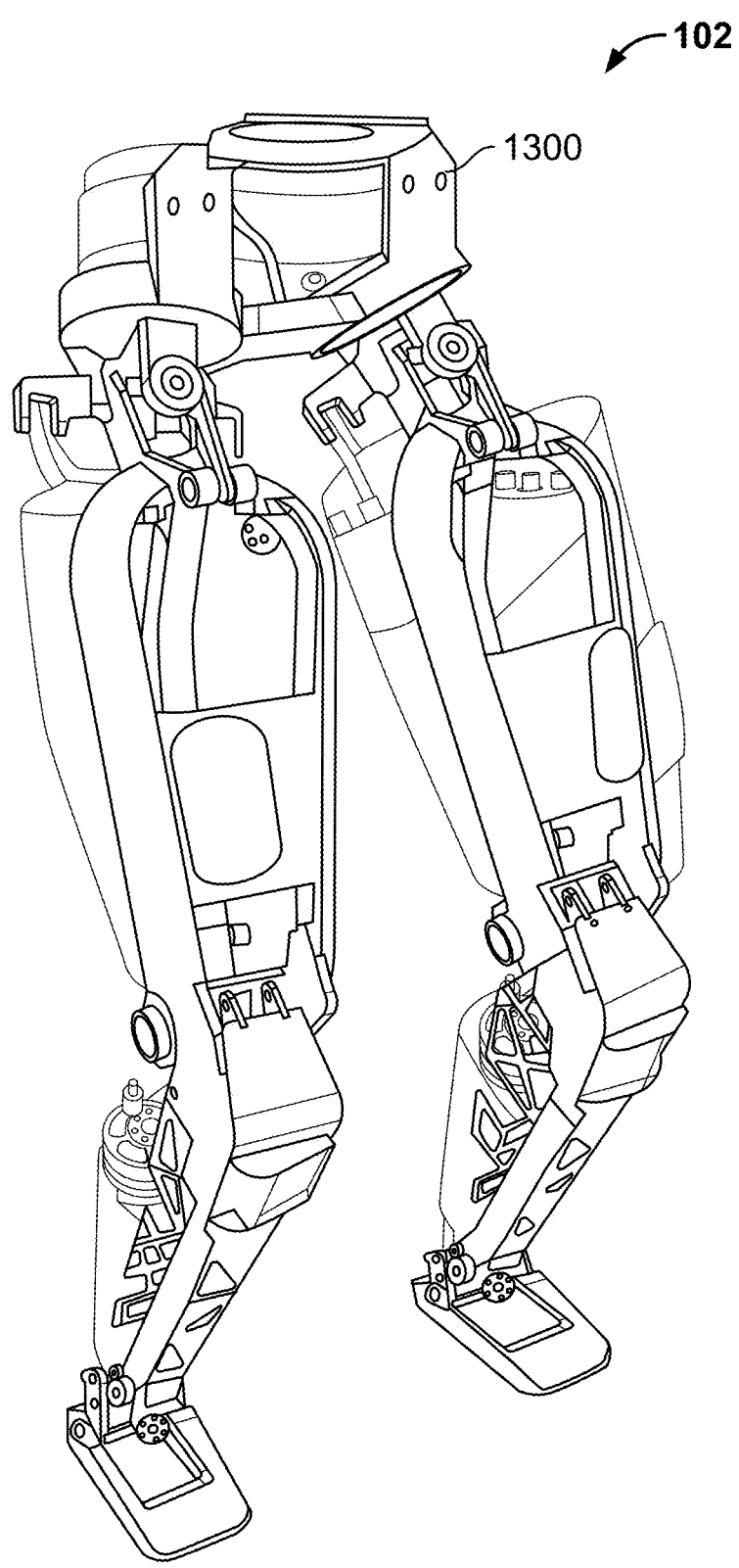
FIGS. 13A-13F are schematic illustrations of portions of a frame assembly of a lower body assembly of an example humanoid robot according to the present disclosure.
Figures 13B, 13C, 13D, 13E, 13F:
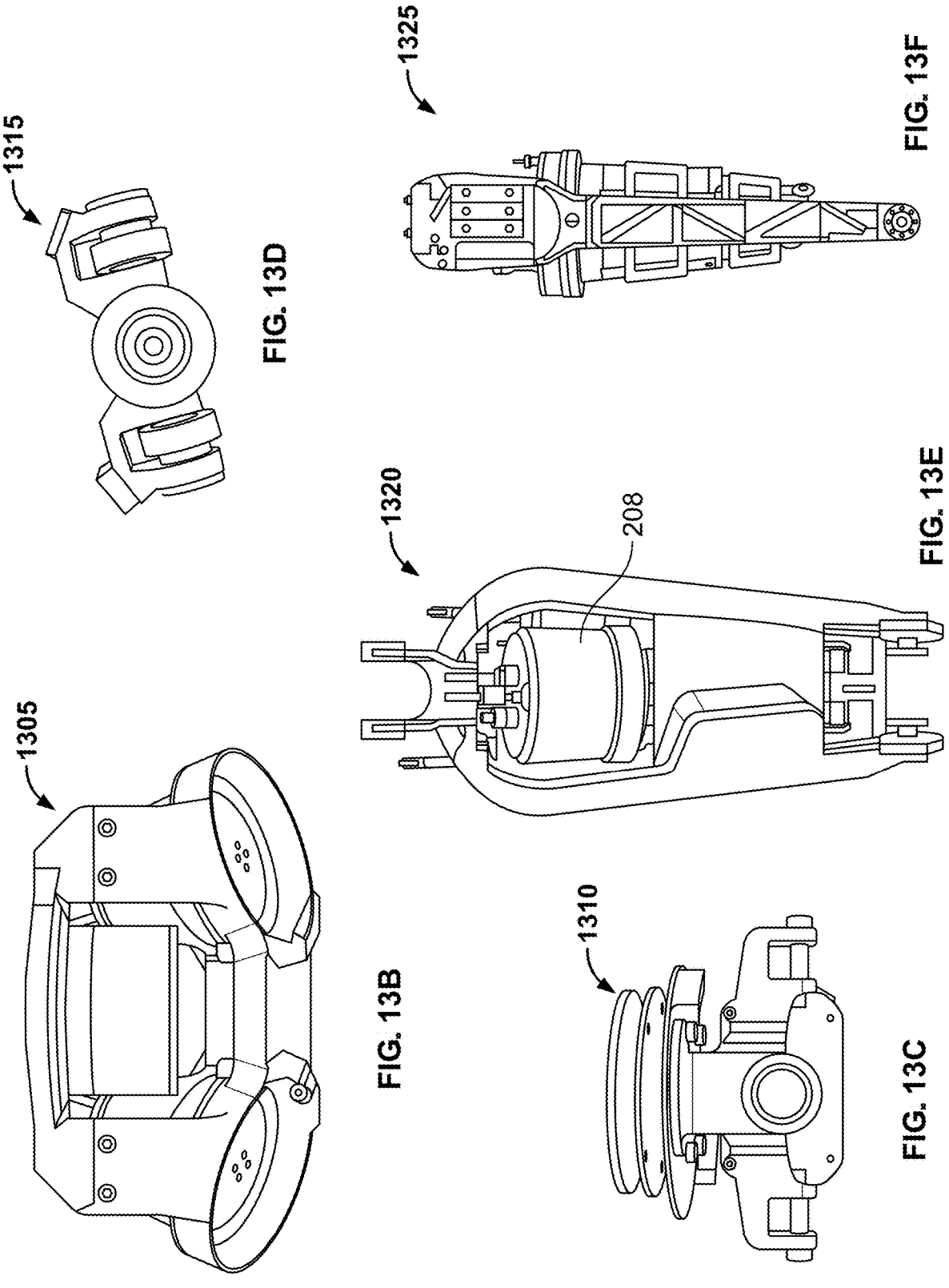

FIG. 12A shows a front view of a torso frame 1200, while FIG. 12B shows a back view of the torso frame 1200. FIG. 12C shows a front view of an upper arm frame 1205, while FIG. 12D shows a back view of the upper arm frame 1205. FIG. 12E shows a view of a lower arm frame 1210. FIG. 13A shows a front, isometric view of a lower body frame 1300 that is part of lower body assembly 102. FIGS. 13B-13E show components of an overall frame assembly, including lower body frame 1300: FIG. 13B shows a pelvis link 1305; FIG. 13C shows a hip IE link 1310; FIG. 13D shows a hip AA link 1315; FIG. 13E shows a thigh link 1320 (with thigh linear actuator 208); and FIG. 13F shows a shin link 1302.

Another not shown in the described figures, certain components, such as motor controllers for linear and radial actuators and other control components include and/or are connected by wiring or cabling. One issue that makes some robots appear less human and not conform to a human envelope is excessive cabling that is visible outside of a robot's outer shell. This excessive wiring may also present a snag hazard. Example implementations of the humanoid robot 100 minimize external cabling by maintaining cabling internally or minimizing external cabling. Example implementations of the humanoid robot 100 also help maintain cabling within the human envelope without putting undue stress on the cabling. More particularly, example implementations of the humanoid robot 100 can define wire paths across joints to minimize stress on both sides of the joint, which allows for no or minimum strain on the board connectors to which cabling connects.

Cabling and board joints may experience undue stress when the ratio of cable path length change to total cable length is too high. Minimizing the cable path length change through the range of motion of a joint to total cable length can ensure that cable does not stretch and put unnecessary stress on the cable, connectors, or boards. Furthermore, bending cables with too sharp a radius can induce local stresses in the cable, which can propagate to apply stresses on the connectors or boards. Example implementations of the humanoid robot 100 can implement features to minimize cable path length change and maximize bend radius.

Certain features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of operating a robot, comprising:
operating a robot that comprises:
    a body assembly that comprises a frame formed of at least one body joint assembly, and
    at least one pair of joint linear actuators that form the at least one body joint assembly, wherein each of the joint linear actuators comprises a quasi-direct drive (QDD) linear actuator;
detecting, with at least one image sensor, an obstacle proximate to the body assembly;

generating, with at least one inertial measurement unit, at least one signal;

providing the at least one signal to at least one motor controller coupled to the at least one pair of joint linear actuators;

operating, based on the at least one signal, the at least one pair of joint linear actuators with the at least one motor controller to adjust the at least one body joint assembly; and controlling the at least one pair of joint linear actuators to operate in combination to adjust the at least one body joint assembly in two degrees of freedom through differential linear actuation.

2. The method of claim 1, wherein the body assembly comprises a torso assembly, the torso assembly comprising:
at least a portion of the frame;
at least one upper body joint assembly of the at least one body joint assembly; and
at least one pair of upper body linear actuators of the at least one pair of joint linear actuators, the at least one pair of upper body linear actuators configured to operate in combination to adjust the upper body joint assembly in two degrees of freedom through differential linear actuation.

3. The method of claim 2, wherein the body assembly comprises a base assembly, the base assembly comprising:
at least another portion of the frame;
at least one lower body joint assembly of the at least one body joint assembly; and
at least one pair of lower body linear actuators of the at least one pair of joint linear actuators, the pair of lower body linear actuators configured to operate in combination to adjust the lower body joint assembly in two degrees of freedom through differential linear actuation.

4. The method of claim 3, wherein the base assembly is coupled to the torso assembly.

5. The method of claim 2, wherein the at least one upper body joint assembly comprises at least six upper body joint assemblies, with each of the at least six upper body joint assemblies comprising a pair of upper body linear actuators.

6. The method of claim 5, wherein the at least six upper body joint assemblies comprise: a first shoulder joint assembly, a second shoulder joint assembly, a first wrist joint assembly, a second wrist joint assembly, a neck joint assembly, and a torso joint assembly.

7. The method of claim 6, wherein each of the first and second shoulder joint assemblies comprises a pair of upper body linear actuators configured to operate in combination to adjust the respective shoulder joint assembly in two degrees of shoulder freedom through differential linear actuation, the two degrees of shoulder freedom comprising roll and yaw.

8. The method of claim 6, wherein the torso joint assembly comprises a pair of upper body linear actuators configured to operate in combination to adjust the torso joint assembly in two degrees of torso freedom through differential linear actuation, the two degrees of torso freedom comprising roll and pitch.

9. The method of claim 3, wherein the at least one lower body joint assembly comprises at least four lower body joint assemblies, with each of the at least four lower body joint assemblies comprising a pair of lower body linear actuators.

10. The method of claim 9, wherein the at least four lower body joint assemblies comprise: a first ankle joint assembly, a second ankle joint assembly, a first hip joint assembly, and a second hip joint assembly.

11. The method of claim 10, wherein each of the first and second ankle joint assemblies comprises a pair of lower body linear actuators configured to operate in combination to adjust the respective ankle joint assembly in two degrees of ankle freedom through differential linear actuation, the two degrees of ankle freedom comprising roll and pitch.

12. The method of claim 10, wherein each of the first and second hip joint assemblies comprises a pair of lower body linear actuators configured to operate in combination to adjust the respective hip joint assembly in two degrees of hip freedom through differential linear actuation, the two degrees of hip freedom comprising roll and pitch.

13. The method of claim 3, wherein the at least one lower body joint assembly comprises a first thigh assembly and a second thigh assembly.

14. The method of claim 13, wherein each of the first thigh assembly and the second thigh assembly comprises:
a pair of lower body linear actuators; and
a thigh linear actuator positioned with the pair of lower body linear actuators and configured to adjust, in combination with the pair of lower body linear actuators, the respective first or second thigh assembly in two degrees of freedom through differential linear actuation.

15. The method of claim 1, wherein the QDD linear actuator comprises a low gear ratio QDD linear actuator.

16. The method of claim 15, wherein the low gear ratio QDD linear actuator comprises a gear ratio of between 10:1 and 50:1.

17. The method of claim 15, wherein the low gear ratio QDD linear actuator comprises at least one screw configured to facilitate a speed reduction.

18. The method of claim 3, wherein the at least one motor controller comprises a first motor controller and a second motor controller, the method further comprising:
operating the first motor controller communicably coupled to each upper body linear actuator of the at least one pair of upper body linear actuators; and
operating the second motor controller communicably coupled to each lower body linear actuator of the at least one pair of lower body linear actuators.

19. The method of claim 18, wherein each of the first and second motor controllers comprises a direct current (DC) motor controller.

20. The method of claim 18, further comprising operating the first motor controller to operate, based on a first signal, to operate the at least one pair of upper body linear actuators in combination to adjust the at least one upper body joint assembly in two degrees of freedom through differential linear actuation.

21. The method of claim 18, further comprising operating the second motor controller, based on a second signal, to operate the at least one pair of lower body linear actuators in combination to adjust the at least one lower body joint assembly in two degrees of freedom through differential linear actuation.

22. The method of claim 18, wherein the robot further comprises a brain that comprises one or more hardware processors, one or more memory modules, and one or more sensors comprising the at least one image sensor and the at least one inertial measurement unit.

23. The method of claim 1, wherein the robot is a humanoid robot.

24. A method of operating a robot, comprising:
operating a robot that comprises:
a body assembly that comprises a frame formed of at least one body joint assembly, and at least one pair of joint linear actuators that form the at least one body joint assembly;

controlling the at least one pair of joint linear actuators to operate in combination to adjust the at least one body joint assembly in two degrees of freedom through differential linear actuation, wherein the body assembly comprises:

a torso assembly, the torso assembly comprising:

at least a portion of the frame;

at least one upper body joint assembly of the at least one body joint assembly; and at least one pair of upper body linear actuators of the at least one pair of joint linear actuators, the at least one pair of upper body linear actuators configured to operate in combination to adjust the upper body joint assembly in two degrees of freedom through differential linear actuation; and a base assembly, the base assembly comprising:

at least another portion of the frame;

at least one lower body joint assembly of the at least one body joint assembly; and at least one pair of lower body linear actuators of the at least one pair of joint linear actuators, the pair of lower body linear actuators configured to operate in combination to adjust the lower body joint assembly in two degrees of freedom through differential linear actuation;

operating a first motor controller communicably coupled to each upper body linear actuator of the at least one pair of upper body linear actuators to operate, based on a first signal, the at least one upper body linear actuators in combination to adjust the at least one upper body joint assembly in two degrees of freedom through differential linear actuation; and operating a second motor controller communicably coupled to each lower body linear actuator of the at least one pair of lower body linear actuators.

25. The method of claim 24, wherein the base assembly is coupled to the torso assembly.

26. The method of claim 24, wherein the at least one upper body joint assembly comprises at least six upper body joint assemblies, with each of the at least six upper body joint assemblies comprising a pair of upper body linear actuators.

27. The method of claim 26, wherein the at least six upper body joint assemblies comprise: a first shoulder joint assembly, a second shoulder joint assembly, a first wrist joint assembly, a second wrist joint assembly, a neck joint assembly, and a torso joint assembly.

28. The method of claim 27, wherein each of the first and second shoulder joint assemblies comprises a pair of upper body linear actuators configured to operate in combination to adjust the respective shoulder joint assembly in two degrees of shoulder freedom through differential linear actuation, the two degrees of shoulder freedom comprising roll and yaw.

29. The method of claim 27, wherein the torso joint assembly comprises a pair of upper body linear actuators configured to operate in combination to adjust the torso joint assembly in two degrees of torso freedom through differential linear actuation, the two degrees of torso freedom comprising roll and pitch.

30. The method of claim 24, wherein the at least one lower body joint assembly comprises at least four lower body joint assemblies, with each of the at least four lower body joint assemblies comprising a pair of lower body linear actuators.

31. The method of claim 30, wherein the at least four lower body joint assemblies comprise: a first ankle joint assembly, a second ankle joint assembly, a first hip joint assembly, and a second hip joint assembly.

32. The method of claim 31, wherein each of the first and second ankle joint assemblies comprises a pair of lower body linear actuators configured to operate in combination to adjust the respective ankle joint assembly in two degrees of ankle freedom through differential linear actuation, the two degrees of ankle freedom comprising roll and pitch.

33. The method of claim 31, wherein each of the first and second hip joint assemblies comprises a pair of lower body linear actuators configured to operate in combination to adjust the respective hip joint assembly in two degrees of hip freedom through differential linear actuation, the two degrees of hip freedom comprising roll and pitch.

34. The method of claim 24, wherein the at least one lower body joint assembly comprises a first thigh assembly and a second thigh assembly.

35. The method of claim 34, wherein each of the first thigh assembly and the second thigh assembly comprises:

a pair of lower body linear actuators; and a thigh linear actuator positioned with the pair of lower body linear actuators and configured to adjust, in combination with the pair of lower body linear actuators, the respective first or second thigh assembly in two degrees of freedom through differential linear actuation.

36. The method of claim 24, wherein each of the joint linear actuators comprises a quasi-direct drive (QDD) linear actuator.

37. The method of claim 36, wherein the QDD linear actuator comprises a low gear ratio QDD linear actuator.

38. The method of claim 37, wherein the low gear ratio QDD linear actuator comprises a gear ratio of between 10:1 and 50:1.

39. The method of claim 37, wherein the low gear ratio QDD linear actuator comprises at least one screw configured to facilitate a speed reduction.

40. The method of claim 24, wherein each of the first and second motor controllers comprises a direct current (DC) motor controller.

41. The method of claim 24, further comprising operating the second motor controller, based on a second signal, to operate the at least one pair of lower body linear actuators in combination to adjust the at least one lower body joint assembly in two degrees of freedom through differential linear actuation.

42. The method of claim 24, wherein the robot further comprises a brain that comprises one or more hardware processors, one or more memory modules, and one or more sensors.

43. The method of claim 42, wherein the one or more sensors comprises at least one inertial measurement unit, and at least one image sensor.

44. The method of claim 43, further comprising:

detecting, with the at least one image sensor, an obstacle proximate to the body assembly;

generating, with the at least one inertial measurement unit, at least one signal;

providing the at least one signal to a motor controller coupled to the at least one pair of joint linear actuators; and operating, based on the at least one signal, the at least one pair of joint linear actuators with the motor controller to adjust the at least one body joint assembly.

45. The method of claim 24, wherein the robot is a humanoid robot.

46. A method of operating a robot, comprising:

operating a robot that comprises:

a body assembly that comprises a frame formed of at least one body joint assembly, and at least one pair of joint linear actuators that form the at least one body joint assembly;

controlling the at least one pair of joint linear actuators to operate in combination to adjust the at least one body joint assembly in two degrees of freedom through differential linear actuation, wherein the body assembly comprises:

a torso assembly, the torso assembly comprising:

at least a portion of the frame;

at least one upper body joint assembly of the at least one body joint assembly; and at least one pair of upper body linear actuators of the at least one pair of joint linear actuators, the at least one pair of upper body linear actuators configured to operate in combination to adjust the upper body joint assembly in two degrees of freedom through differential linear actuation; and a base assembly, the base assembly comprising:

at least another portion of the frame;

at least one lower body joint assembly of the at least one body joint assembly; and at least one pair of lower body linear actuators of the at least one pair of joint linear actuators, the pair of lower body linear actuators configured to operate in combination to adjust the lower body joint assembly in two degrees of freedom through differential linear actuation;

operating a first motor controller communicably coupled to each upper body linear actuator of the at least one pair of upper body linear actuators; and operating a second motor controller communicably coupled to each lower body linear actuator of the at least one pair of lower body linear actuators to operate, based on a second signal, the at least one pair of lower body linear actuators in combination to adjust the at least one lower body joint assembly in two degrees of freedom through differential linear actuation.

47. The method of claim 46, wherein the base assembly is coupled to the torso assembly.

48. The method of claim 46, wherein the at least one lower body joint assembly comprises at least four lower body joint assemblies, with each of the at least four lower body joint assemblies comprising a pair of lower body linear actuators.

49. The method of claim 48, wherein the at least four lower body joint assemblies comprise: a first ankle joint assembly, a second ankle joint assembly, a first hip joint assembly, and a second hip joint assembly.

50. The method of claim 46, wherein the at least one lower body joint assembly comprises a first thigh assembly and a second thigh assembly.

51. The method of claim 46, wherein each of the joint linear actuators comprises a quasi-direct drive (QDD) linear actuator.

52. The method of claim 51, wherein the QDD linear actuator comprises a low gear ratio QDD linear actuator.

* * * * *